United States Patent
Ryu et al.

(10) Patent No.: US 7,273,077 B2
(45) Date of Patent: Sep. 25, 2007

(54) APPARATUS AND METHOD OF DISPENSING LIQUID CRYSTAL

(75) Inventors: Jae-Choon Ryu, Gyeongsangbuk-Do (KR); Sang-Hyun Kim, Gyeongsangbuk-Do (KR); Sung-Su Jung, Daegu (KR); Dong-Ho Park, Chungsheongbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 29 days.

(21) Appl. No.: 10/995,564

(22) Filed: Nov. 24, 2004

(65) Prior Publication Data

US 2005/0133109 A1    Jun. 23, 2005

(30) Foreign Application Priority Data

Nov. 28, 2003   (KR) ...................... 10-2003-0085738

(51) Int. Cl.
*B65B 1/04*    (2006.01)
(52) U.S. Cl. .......................... 141/198; 141/95; 427/256
(58) Field of Classification Search .................. 141/67, 141/95, 198, 192, 4, 7, 286, 301; 222/386–388; 427/256; 118/665, 688
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |

(Continued)

FOREIGN PATENT DOCUMENTS

CN    86104087 A    1/1987

(Continued)

OTHER PUBLICATIONS

Republic of China Office Action dated Oct. 20, 2006.

*Primary Examiner*—Steven O. Douglas
(74) *Attorney, Agent, or Firm*—McKenna Long & Aldridge LLP

(57) ABSTRACT

An apparatus for dispensing liquid crystal material including a container containing liquid crystal material, a discharge pump drawing-in liquid crystal material and discharging the drawn liquid crystal material, a nozzle dispensing the discharged liquid crystal material onto LCD panel regions as a plurality of liquid crystal droplets, and a control unit calculating a total amount of liquid crystal material to be dispensed onto each LCD panel region as a dispensing pattern of liquid crystal droplets each having an amount of liquid crystal material contained therein and for compensating the total amount of liquid crystal material by at least one of: compensating the predetermined number of liquid crystal droplets arranged within the predetermined dispensing pattern, and compensating the predetermined amount of liquid crystal material within at least one liquid crystal droplet.

50 Claims, 19 Drawing Sheets

U.S. PATENT DOCUMENTS

| | | |
|---|---|---|
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,952,676 A | 9/1999 | Sato et al. |
| 5,956,112 A | 9/1999 | Fujimori et al. |
| 6,001,203 A | 12/1999 | Yamada et al. |
| 6,011,609 A | 1/2000 | Kato et al. |
| 6,016,178 A | 1/2000 | Kataoka et al. |
| 6,016,181 A | 1/2000 | Shimada |
| 6,055,035 A | 4/2000 | von Gutfeld et al. |
| 6,163,357 A | 12/2000 | Nakamura |
| 6,219,126 B1 | 4/2001 | von Gutfeld |
| 6,226,067 B1 | 5/2001 | Nishiguchi et al. |
| 6,236,445 B1 | 5/2001 | Foschaar et al. |
| 6,304,306 B1 | 10/2001 | Shiomi et al. |
| 6,304,311 B1 | 10/2001 | Egami et al. |
| 6,337,730 B1 | 1/2002 | Ozaki et al. |
| 6,414,733 B1 | 7/2002 | Ishikawa et al. |
| 6,610,364 B1 | 8/2003 | Kweon et al. |
| 2001/0021000 A1 | 9/2001 | Egami |
| 2001/0026348 A1 | 10/2001 | Murata et al. |
| 2004/0261895 A1 | 12/2004 | Ryu |
| 2005/0000982 A1 | 1/2005 | Ryu |

FOREIGN PATENT DOCUMENTS

| | | |
|---|---|---|
| CN | 1441292 A | 9/2003 |
| EP | 1 003 066 A1 | 5/2000 |
| JP | 51-065656 | 6/1976 |
| JP | 57-038414 A1 | 3/1982 |
| JP | 57-088428 A1 | 6/1982 |
| JP | 58-027126 A1 | 2/1983 |
| JP | 59-057221 | 4/1984 |
| JP | 59-195222 | 11/1984 |
| JP | 60-111221 | 6/1985 |
| JP | 60-164723 A1 | 8/1985 |
| JP | 60-217343 A1 | 10/1985 |
| JP | 61-007822 A1 | 1/1986 |
| JP | 61-055625 A1 | 3/1986 |
| JP | 62-089025 A1 | 4/1987 |
| JP | 62-090622 A1 | 4/1987 |
| JP | 62-205319 A1 | 9/1987 |
| JP | 63-109413 A1 | 5/1988 |
| JP | 63-110425 A1 | 5/1988 |
| JP | 63-128315 A1 | 5/1988 |
| JP | 63-311233 A1 | 12/1988 |
| JP | 05-127179 A1 | 5/1993 |
| JP | 05-154923 | 6/1993 |
| JP | 05-265011 A1 | 10/1993 |
| JP | 05-281557 A1 | 10/1993 |
| JP | 05-281562 A1 | 10/1993 |
| JP | 06-051256 A1 | 2/1994 |
| JP | 06-148657 A1 | 5/1994 |
| JP | 06-160871 | 6/1994 |
| JP | 06-235925 | 8/1994 |
| JP | 06-265915 A1 | 9/1994 |
| JP | 06-313870 | 11/1994 |
| JP | 07-084268 | 3/1995 |
| JP | 07-128674 A1 | 5/1995 |
| JP | 07-181507 A1 | 7/1995 |
| JP | 08-095066 A1 | 4/1996 |
| JP | 08-101395 | 4/1996 |
| JP | 08-106101 A1 | 4/1996 |
| JP | 08-171094 A1 | 7/1996 |
| JP | 08-190099 A1 | 7/1996 |
| JP | 08-240807 A1 | 9/1996 |
| JP | 09-005762 A1 | 1/1997 |
| JP | 09-026578 A1 | 1/1997 |
| JP | 09-061829 | 3/1997 |
| JP | 09-073075 A1 | 3/1997 |
| JP | 09-073096 A1 | 3/1997 |
| JP | 09-127528 A1 | 5/1997 |
| JP | 09-230357 A1 | 9/1997 |
| JP | 09-281511 A1 | 10/1997 |
| JP | 09-311340 A1 | 12/1997 |
| JP | 10-123537 A1 | 5/1998 |
| JP | 10-123538 A1 | 5/1998 |
| JP | 10-142616 A1 | 5/1998 |
| JP | 10-177178 | 6/1998 |
| JP | 10-221700 A1 | 8/1998 |
| JP | 10-282512 A1 | 10/1998 |
| JP | 10-333157 | 12/1998 |
| JP | 10-333159 | 12/1998 |
| JP | 11-014953 A1 | 1/1999 |
| JP | 11-038424 A1 | 2/1999 |
| JP | 11-064811 A1 | 3/1999 |
| JP | 11-109388 A1 | 4/1999 |
| JP | 11-133438 | 5/1999 |
| JP | 11-142864 | 5/1999 |
| JP | 11-174477 A1 | 7/1999 |
| JP | 11-212045 A1 | 8/1999 |
| JP | 11-248930 | 9/1999 |
| JP | 11-326922 | 11/1999 |
| JP | 11-344714 A1 | 12/1999 |
| JP | 2000-002879 | 1/2000 |
| JP | 2000-029035 | 1/2000 |
| JP | 2000-056311 | 2/2000 |
| JP | 2000-066165 | 3/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-209052 | 8/2001 |
| JP | 2001-209060 | 8/2001 |
| JP | 2001-222017 | 8/2001 |
| JP | 2001-235758 | 8/2001 |
| JP | 2001-215459 | 9/2001 |
| JP | 2001-255542 | 9/2001 |
| JP | 2001-264782 | 9/2001 |
| JP | 2001-201750 | 10/2001 |
| JP | 2001-272640 | 10/2001 |
| JP | 2001-281675 | 10/2001 |
| JP | 2001-281678 | 10/2001 |

| | | | | | | |
|---|---|---|---|---|---|---|
| JP | 2001-282126 | 10/2001 | | JP | 2002-090759 A1 | 3/2002 |
| JP | 2001-305563 | 10/2001 | | JP | 2002-090760 A1 | 3/2002 |
| JP | 2001-330837 | 11/2001 | | JP | 2002-107740 A1 | 4/2002 |
| JP | 2001-330840 A1 | 11/2001 | | JP | 2002-122872 A1 | 4/2002 |
| JP | 2001-356353 | 12/2001 | | JP | 2002-122873 A1 | 4/2002 |
| JP | 2001-356354 A1 | 12/2001 | | JP | 2002-139734 | 5/2002 |
| JP | 2002-014360 A1 | 1/2002 | | JP | 2002-202512 A1 | 7/2002 |
| JP | 2002-023176 A1 | 1/2002 | | JP | 2002-202514 A1 | 7/2002 |
| JP | 2002-049045 A1 | 2/2002 | | JP | 2002-214626 A1 | 7/2002 |
| JP | 2002-082340 A1 | 3/2002 | | KR | 2000-035302 A1 | 6/2000 |

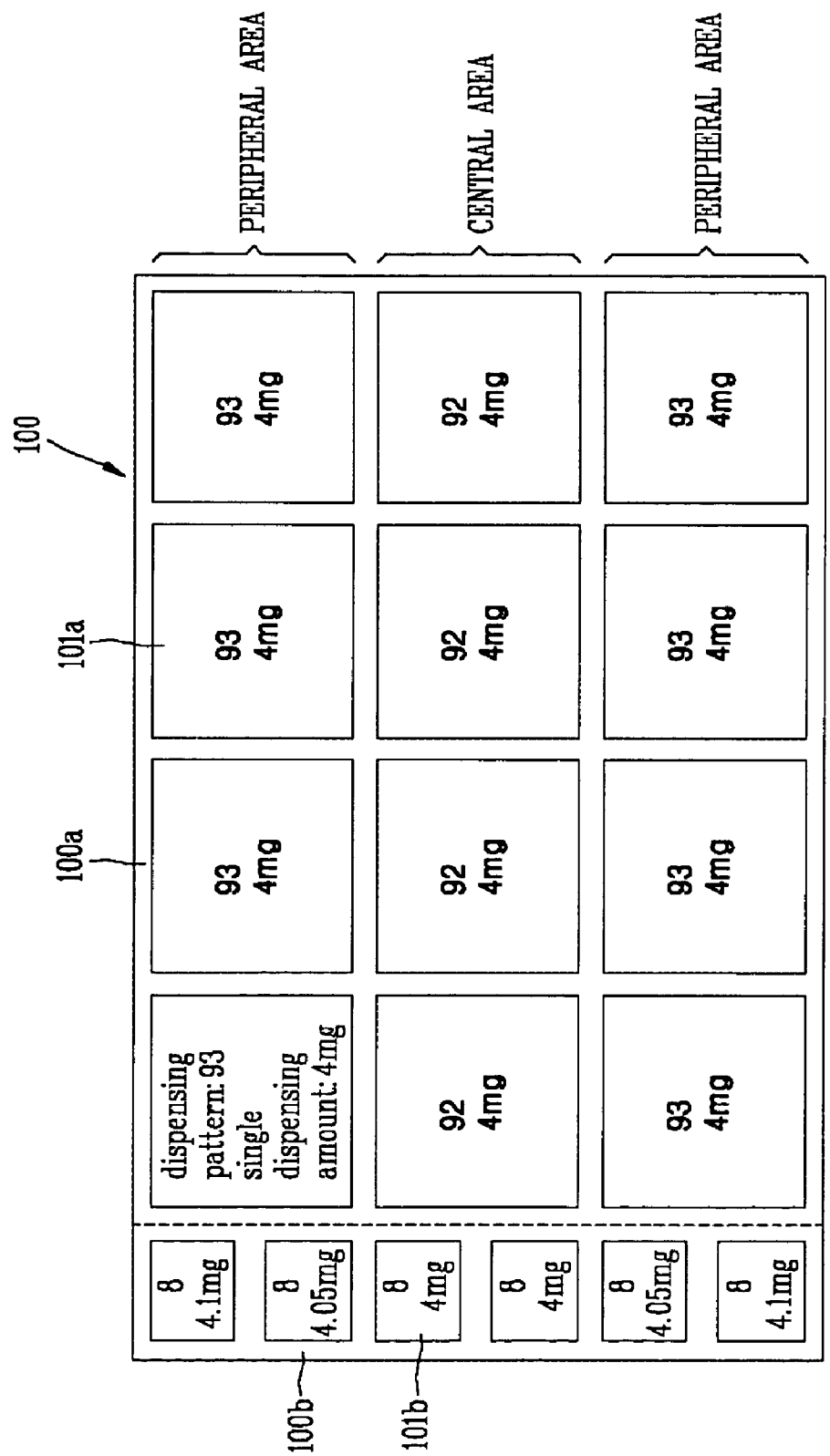

APPARATUS AND METHOD OF DISPENSING LIQUID CRYSTAL

This application claims the benefit of Korean Patent Application No. P2003-85738, filed on Nov. 28, 2003, which is hereby incorporated by reference for all purposes as if fully set forth herein.

BACKGROUND OF THE INVENTION

1. Field of the Invention

The present invention relates to a liquid crystal dispensing apparatus. More particularly, the present invention relates to a liquid crystal dispensing apparatus capable of dispensing precise amounts of liquid crystal material onto liquid crystal display (LCD) panels of various sizes.

2. Discussion of the Related Art

As various portable electric devices such as mobile phones, personal digital assistant (PDA), note book computers, etc., continue to be developed, various types of flat panel display devices such as liquid crystal displays (LCDs), plasma display panels (PDPs), field emission displays (FEDs), and vacuum fluorescent displays (VFDs), having a compact construction, light weight, and low power-consumption characteristics also continue to be developed. Owing to the ease with which they are driven, and to their superior ability to display images, LCDs are extensively used.

FIG. 1 illustrates a cross sectional view of a related art LCD device.

Referring to FIG. 1, a related art LCD device 1 generally comprises a lower substrate 5, an upper substrate 3, and a liquid crystal layer 7 formed therebetween. The lower substrate 5 (i.e., a driving device array substrate) includes a plurality of pixels (not shown), and a driving device (e.g., a thin film transistor (TFT)) and pixel electrode formed at each pixel. The upper substrate 3 (i.e., a color filter substrate) includes a color filter layer for realizing color and a common electrode. An alignment layer is formed on both the lower and upper substrates 5 and 3 to align liquid crystal molecules of the liquid crystal layer 7. The lower substrate 5 and the upper substrate 3 are attached to each other by a sealant material 9, formed at peripheral regions thereof. Accordingly, the liquid crystal 7 is confined within an area defined by the sealant material.

Light transmittance characteristics of the pixels are controlled by causing the driving devices to generate electric fields between the pixel electrodes and the common electrode. The generated electric fields reorient liquid crystal molecules of the liquid crystal layer 7 to display a picture.

FIG. 2 illustrates a flow chart of a related art method of fabricating the LCD device shown in FIG. 1.

Referring to FIG. 2, the related art method of fabricating the LCD device described above generally consists of three sub-processes: a TFT array substrate forming process; a color filter substrate forming process; and a cell forming process.

At step S101, a TFT array substrate forming process is performed whereby a plurality of gate lines and data lines are formed on the lower substrate 5 (e.g., a glass substrate) to define an array of pixel areas. TFTs are connected to the gate and the data lines within each pixel area and pixel electrodes are connected to the thin film transistors to drive a subsequently provided liquid crystal layer in accordance with a signal applied through the thin film transistor.

At step S104, a color filter process is performed whereby R, G, and B color filter layers, for realizing predetermined colors, and a common electrode are formed on the upper substrate 3 (i.e., a glass substrate).

At steps S102 and S105, alignment layers are formed over the entire surface of both the lower substrate 5 and upper substrate 3, respectively. Subsequently, the alignment layers are rubbed to induce predetermined surface anchoring characteristics (i.e., a pretilt angle and alignment direction) within the liquid crystal molecules of the liquid crystal layer 7.

At step S103, spacers are dispersed onto the lower substrate 5. At step S106, sealant material is printed at peripheral regions of the upper substrate 3. At step S107, the lower and upper substrates 5 and 3 are pressed and bonded together (i.e., assembled) and the spacers dispersed at step S103 ensure that a cell gap formed between the assembled lower and upper substrates 5 and 3 is uniform.

At step S108, the assembled upper and lower substrates 5 and 3 are cut into unit LCD panels. Specifically, the lower substrate 5 and the upper substrate 3 each include a plurality of unit panel areas, within each of which individual TFT arrays and color filters are formed.

At step S109, liquid crystal material is injected into the cell gap of each of the unit LCD panels through a liquid crystal injection hole defined within the sealant material. After each cell gap is completely filled with liquid crystal material, the liquid crystal injection hole is sealed. At step S110, the filled and sealed unit LCD panels are then tested.

FIG. 3 illustrates a related art liquid crystal injection system for fabricating the related art LCD device.

Referring to FIG. 3, a container 12, containing a supply of liquid crystal material 14, is placed into a vacuum chamber 10 that is connected to a vacuum pump (not shown). Subsequently, a unit LCD panel 1, formed as described above with respect to FIG. 2, is arranged over the container 12 using a unit panel handling device (not shown). Next, the vacuum pump is operated to reduce the pressure within the vacuum chamber 10 to a predetermined vacuum state. The unit panel handling device then lowers the unit LCD panel 1 such that the liquid crystal injection hole 16 contacts a surface of the supply of liquid crystal material 14. After contact is established, liquid crystal material 14 contained within the container 12 can be drawn through the liquid crystal injection hole 16 and into the cell gap of the unit LCD panel 1 due to a capillary effect. The injection method described above, therefore, is generally known as a dipping injection method.

After contact is established, the rate at which the liquid crystal material 14 is drawn into to the cell gap of the unit LCD panel 1 can be increased by pumping nitrogen gas ($N_2$) into the vacuum chamber 10, thereby increasing the pressure within the vacuum chamber 10. As the pressure within the vacuum chamber 10 increases, a pressure differential is created between within the cell gap of the unit LCD panel 1 and the interior of the vacuum chamber 10. Accordingly, more liquid crystal material 14 contained by the container 12 can be injected into the cell gap of the unit LCD panel 1 and at an increased injection rate. As mentioned above, once the liquid crystal material 14 completely fills the cell gap of the unit panel 1, the injection hole 16 is sealed by a sealant and the injected liquid crystal material 14 is sealed within the unit LCD panel 1. The injection method described above, therefore, is generally known as a vacuum injection method.

Despite their usefulness, the aforementioned dipping and vacuum injection method methods can be problematic for several reasons.

First, the total amount of time required to completely fill the cell gap of the unit LCD panel 1 with liquid crystal material 14, according to the dipping/vacuum injection methods, can be relatively long. Specifically, a cell gap thickness of the unit LCD panel 1 is only a few micrometers wide. Therefore, only a small amount of liquid crystal material 14 can be injected into the unit panel 1 per unit time. For example, it can take about 8 hours to completely inject liquid crystal material 14 into the cell gap of a 15-inch unit LCD panel, thereby reducing the efficiency with which LCD devices can be fabricated.

Second, the aforementioned dipping/vacuum injection methods require an excessively large amount of liquid crystal material 14 compared to the relatively small amount of liquid crystal material 14 actually injected into the unit LCD panel 1. Because liquid crystal material 14 contained by the container 12 is exposed to the atmosphere, or certain other process gases during loading and unloading of the unit LCD panel 1 into and out of the vacuum chamber 10, liquid crystal material 14 contained by the container 12 can easily become contaminated. Therefore, the uninjected liquid crystal material 14 must be discarded, thereby reducing the efficiency with which expensive liquid crystal material is used and increasing the cost of fabricating a unit LCD panel 1.

SUMMARY OF THE INVENTION

Accordingly, the present invention is directed to apparatus and method of dispensing liquid crystal that substantially obviates one or more of the problems due to limitations and disadvantages of the related art.

An advantage of the present invention provides a liquid crystal dispensing apparatus capable of dispensing liquid crystal material directly onto a substrate of a liquid crystal display (LCD) panel, and a dispensing method thereof.

Another advantage of the present invention provides liquid crystal dispensing apparatus capable of precisely controlling a total amount of liquid crystal material dispensed onto a substrate according to, for example, the size of the LCD panel.

Still another advantage of the present invention provides a liquid crystal dispensing apparatus capable of precisely controlling a total amount of liquid crystal material dispensed onto LCD panels of various sizes according to, for example, the size of each LCD panel, and a dispensing method thereof.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal dispensing apparatus for dispensing liquid crystal material onto a plurality of liquid crystal display (LCD) panel regions formed on a substrate may, for example, a container for containing the liquid crystal material; a discharge pump for drawing in the liquid crystal material from the container and discharging the drawn liquid crystal material; a nozzle for dispensing the discharged liquid crystal material onto each LCD panel region as a plurality of liquid crystal droplets; and a control unit for calculating a total amount of liquid crystal material to be dispensed onto each LCD panel region as a predetermined number of liquid crystal droplets arranged in a predetermined dispensing pattern and each liquid crystal droplet having a predetermined amount of liquid crystal material contained therein and for compensating the total amount of liquid crystal material by at least one of: compensating the predetermined number of liquid crystal droplets arranged within the predetermined dispensing pattern, and compensating the predetermined amount of liquid crystal material within at least one liquid crystal droplet.

In one aspect of the present invention, the discharge pump may, for example, include a cylinder having a suction opening and a discharge opening; and a piston for drawing the liquid crystal material in through the suction opening and for discharging the liquid crystal material out through the discharge opening. The piston may be arranged within the cylinder and include a groove at a lower center region thereof. Further, the piston may be rotatable and axially translatable within the cylinder.

In another aspect of the present invention, the control unit may, for example, include a spacer height inputting unit for receiving a spacer height of each LCD panel region; a dispensing amount calculating unit for calculating the total amount of liquid crystal material to be dispensed onto each LCD panel region as the predetermined number of liquid crystal droplets arranged in the predetermined dispensing pattern; a compensation amount calculating unit coupled to the spacer height inputting unit and the dispensing amount calculating unit for compensating the calculated total amount of liquid crystal to be dispensed onto each LCD panel region; and a motor driving unit for driving a motor to operate the discharge pump.

In still another aspect of the present invention, the dispensing amount calculating unit may, for example, include a single dispensing amount calculating unit coupled to the inputting unit for calculating the predetermined amount of liquid crystal material to be dispensed within each liquid crystal droplet; and a dispensing pattern calculating unit coupled to the single dispensing amount calculating unit for calculating the predetermined dispensing pattern.

In yet another aspect of the present invention, the compensation amount calculating unit may, for example, include an LCD panel certifying unit coupled to the inputting unit for determining the size of an LCD panel region onto which droplets of liquid crystal material are to be dispensed; a dispensing pattern compensating unit coupled to the spacer height inputting unit, the dispensing amount calculating unit, and the LCD panel certifying unit for compensating the predetermined dispensing pattern when a determined area of an LCD panel region is greater than a predetermined area; and a single dispensing amount compensating unit coupled to the spacer height inputting unit and the dispensing amount calculating unit for compensating the calculated amount of liquid crystal material to be dispensed within at least one liquid crystal droplet when the determined area is less than the predetermined area.

According to principles of the present invention, method of dispensing liquid crystal material on a plurality of liquid crystal display (LCD) panel regions formed on a substrate may, for example, include calculating a total amount of liquid crystal material to be dispensed onto each LCD panel region as a predetermined number of liquid crystal droplets arranged in a predetermined dispensing pattern, wherein each liquid crystal droplet contains a predetermined amount of liquid crystal material; compensating the calculated total amount of liquid crystal material to be dispensed onto at least one LCD panel region; aligning a liquid crystal dispensing apparatus with a dispensing positions of each LCD panel region; dispensing the calculated total amount of liquid crystal material onto at least one LCD panel region;

and dispensing the compensated amount of liquid crystal material onto at least one LCD panel region.

In one aspect of the present invention, the total amount of liquid crystal material to be dispensed may be calculated by, for example, calculating an amount of liquid crystal material to be dispensed within each liquid crystal droplet; and calculating a dispensing pattern in which the plurality of liquid crystal droplets are to be dispensed.

In another aspect of the present invention, the calculated total amount of liquid crystal material to be dispensed onto the at least one LCD panel region may be compensated by, for example, determining an area of each LCD panel region; compensating the predetermined number of liquid crystal droplets arranged within the predetermined dispensing pattern based on a spacer height of the at least one LCD panel region when the area of the at least one LCD panel region is larger than the predetermined area; and compensating the predetermined amount of liquid crystal material contained within at least one liquid crystal droplet based on the spacer height of the at least one LCD panel region when the n area of the at least one LCD panel region is less than the predetermined area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 17A and 17B schematically illustrate exemplary combinations of dispensing patterns and droplet amounts in LCD panels distributed on a single substrate;

DETAILED DESCRIPTION OF THE ILLUSTRATED EMBODIMENTS

Reference will now be made in detail to embodiments of the present invention, examples of which are illustrated in the accompanying drawings.

To resolve problems associated with the aforementioned related art dipping/vacuum injection methods, a liquid crystal dispensing method has been proposed. According to the liquid crystal dispensing method, a liquid crystal layer may be formed by dispensing liquid crystal material directly onto one of the upper or lower substrates. Subsequently, the dispensed liquid crystal material is spread over the substrate upon pressing and bonding the upper and lower substrates together (i.e., assembling the upper and lower substrates). Accordingly, liquid crystal layers may be formed quicker by employing the liquid crystal dispensing method than by employing the related art dipping/vacuum injection methods. Further, the liquid crystal dispensing method consumes less liquid crystal material than either of the related art dipping/vacuum injection methods.

Figure 4:
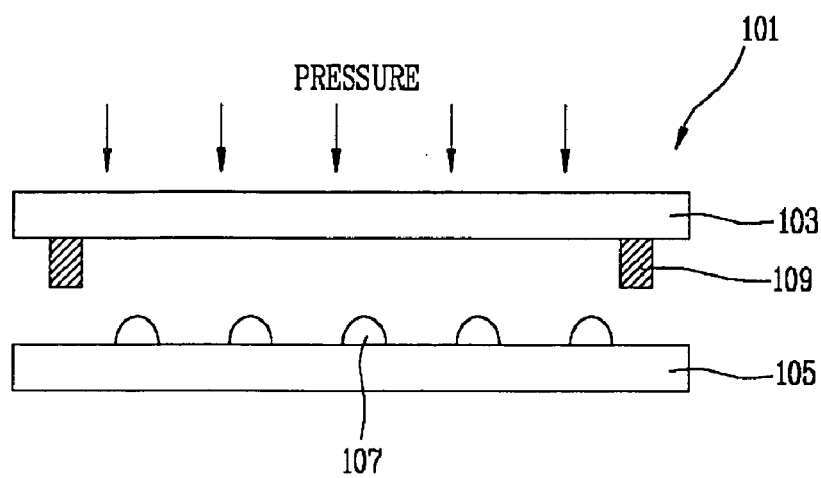
FIG. 4 illustrates a cross sectional view of an LCD device fabricated in accordance with a liquid crystal dispensing method of the present invention.

FIG. 4 illustrates a cross sectional view of an LCD device fabricated by applying the liquid crystal dispensing method.

Referring to FIG. 4, liquid crystal material 107 may be dispensed directly onto one of a lower substrate 105 or an upper substrate 103 prior to assembling the two substrates. In one aspect of the present invention, the lower substrate may include the aforementioned TFT array substrate. In another aspect of the present invention, the upper substrate may include the aforementioned color filter substrate. Sealant material 109 may be applied to peripheral regions of one of the lower or upper substrates 105 or 103, respectively. As mentioned above, the dispensed liquid crystal material 107 spreads between the lower and upper substrates 105 and 103 as the substrates are pressed and bonded together to form an LCD panel 101 having a liquid crystal layer with a substantially uniform thickness.

Figure 5:
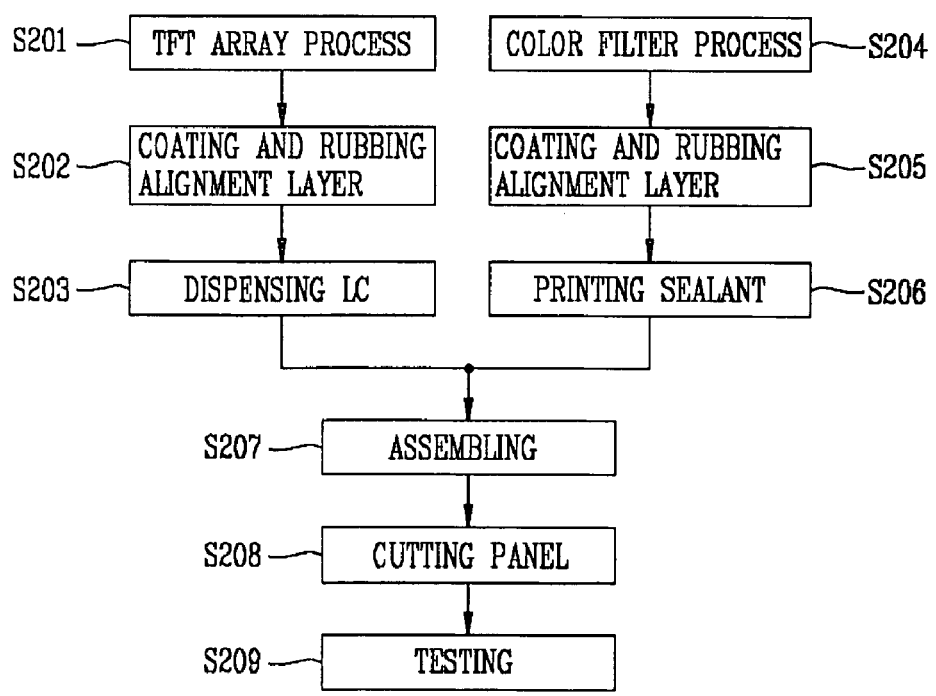
FIG. 5 illustrates a flow chart of a method of fabricating an LCD device according to a liquid crystal dispensing method.

FIG. 5 illustrates a flow chart of a method of fabricating an LCD device according to a liquid crystal dispensing method.

At step S201, an array of driving devices, such as TFTs, may be formed on an upper substrate 103 in a TFT array substrate forming process. In one aspect of the present invention, the TFT array substrate forming process may include steps of forming a plurality of gate lines and data lines on the lower substrate 5 to define an array of pixel areas; connecting TFTs to the gate and the data lines within each pixel area; and connecting pixel electrodes to the TFTs.

At step S204, a color filter layer may be formed on a lower substrate 105 in a color filter substrate forming process. In one aspect of the present invention, the color filter process may include steps of forming R, G, and B color filter layers, for realizing predetermined colors, and a common electrode on the upper substrate 3.

In one aspect of the present invention, the upper and lower substrates 103 and 105, respectively may be provided as glass substrates having an area of at least about 1000×1200 mm$^2$. It will be appreciated, however, that the upper and lower substrates 103 and 105 may be formed of glass substrates having a smaller area.

At steps S202 and S205, alignment layers may be formed over the entire surface of both the lower and upper substrates. Subsequently, the alignment layers may be imparted with alignment structures via processes such as rubbing, irradiation to predetermined wavelengths of electromagnetic radiation, or the like.

At step S203, liquid crystal material may be dispensed directly onto a unit panel area defined, for example, on the lower substrate 105. At step S206, sealant material may be printed at peripheral regions of a unit panel area defined, for example, on the upper substrate 103. At step S207, the upper and lower substrates 103 and 105 may be aligned and subsequently pressed and bonded together (i.e., assembled). Upon assembling the upper and lower substrates 103 and 105, the dispensed liquid crystal material may be evenly spread between the upper and lower substrates within a region defined by the sealant material.

At step S208, the assembled upper and lower substrates may be cut into a plurality of unit LCD panels. Finally, at step S209, the unit LCD panels may be tested.

In view of the discussion above, fabricating unit LCD panels using the liquid crystal dispensing method is different from fabricating unit LCD panels using the related art dipping/vacuum injection methods.

Figure 1:
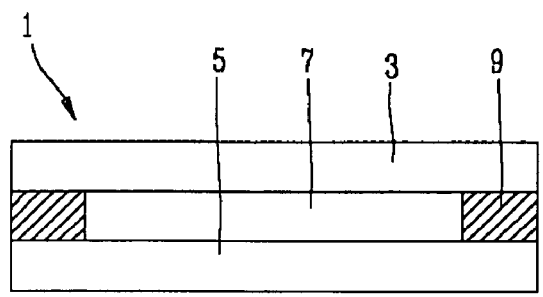
FIG. 1 illustrates a cross sectional view of a related art LCD device.
Figure 2:
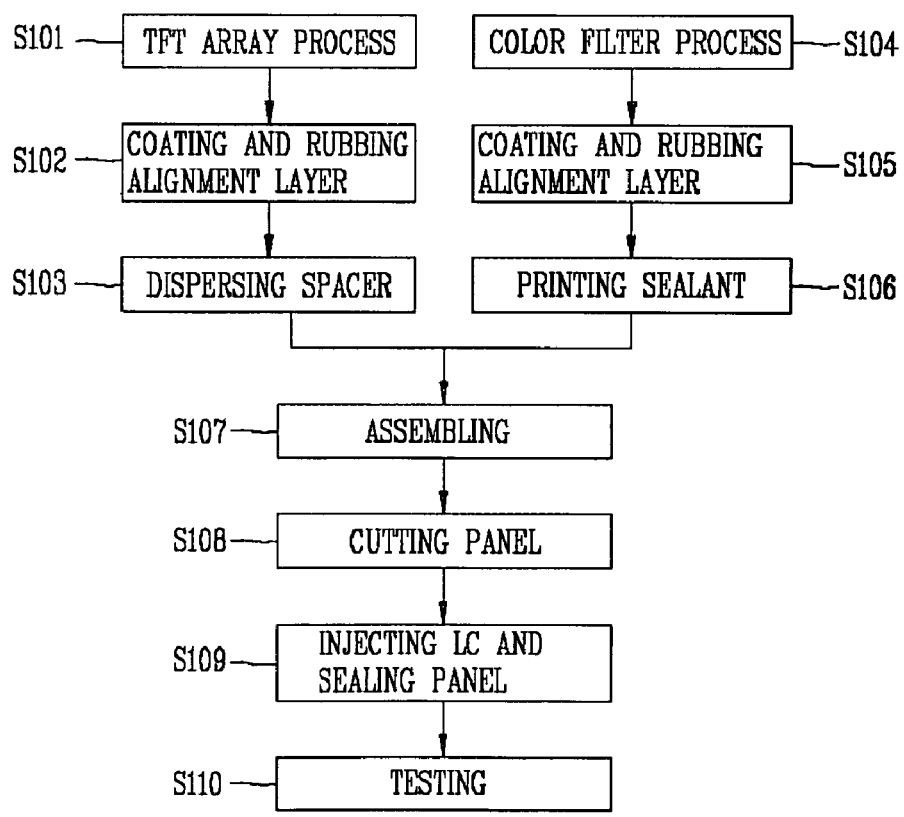
FIG. 2 illustrates a flow chart of a related art method for fabricating the LCD device shown in FIG. 1.
Figure 3:
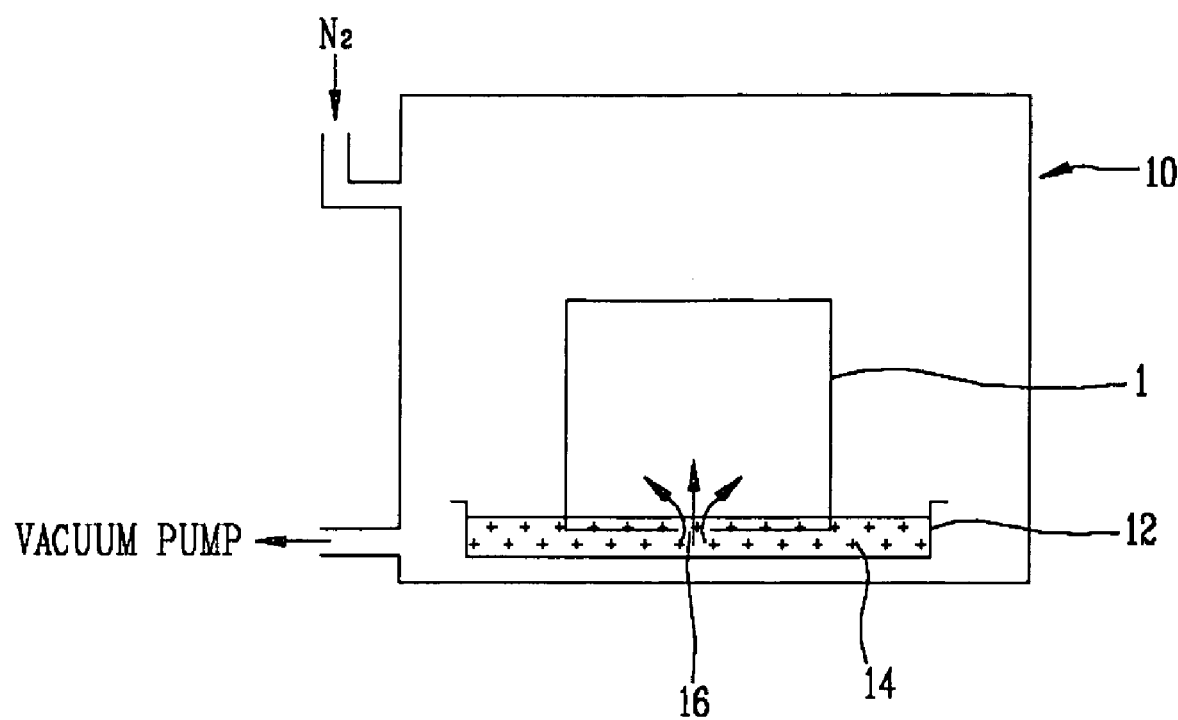
FIG. 3 illustrates a related art liquid crystal injection system for fabricating the related art LCD device.

Specifically, the related art fabrication processes as illustrated in FIG. 2 involve injecting liquid crystal material into a predefined cell gap through a liquid crystal injection hole defined within sealant material followed by sealing the liquid crystal injection hole. Although not shown in FIG. 2, upon injecting the liquid crystal material 14 into the cell gap of the unit panel 1 (see FIG. 3), outer surfaces of the unit LCD panel 1 contact liquid crystal material 14 contained within the container 12 and must be washed after the cell gap is completely filled with liquid crystal material 14.

The liquid crystal dispensing processes illustrated in FIG. 5, however, involve dispensing liquid crystal material directly onto a substrate, thereby eliminating the need to form any seal or liquid crystal injection hole. Moreover, because the liquid crystal material is dispensed directly onto the substrate, outer surfaces of a subsequently LCD panel need not be washed to remove liquid crystal material. Accordingly, LCD panels may be fabricated more simply using the liquid crystal dispensing method than using the related art dipping/vacuum injection methods. Further, the liquid crystal dispensing method has a higher yield than the related art dipping/vacuum injection methods.

To fabricate LCD panels using the liquid crystal dispensing method, dispensing positions (i.e., positions on a substrate where droplets of liquid crystal material are to be dispensed) and droplet amounts (e.g., amounts of liquid crystal material within each droplet of liquid crystal material) heavily influence the formation of a liquid crystal layer having a desired thickness. Because the thickness of a liquid crystal layer is closely related to, for example, the volume of the cell gap of the LCD panel, dispensing positions and droplet amounts must controlled precisely to avoid fabricating a defective LCD panel. Accordingly, the principles of the present invention provide a liquid crystal dispensing apparatus that ensures that actual dispensing positions and droplet amounts are precisely controlled to match predetermined dispensing positions and droplet amounts.

Figure 6:
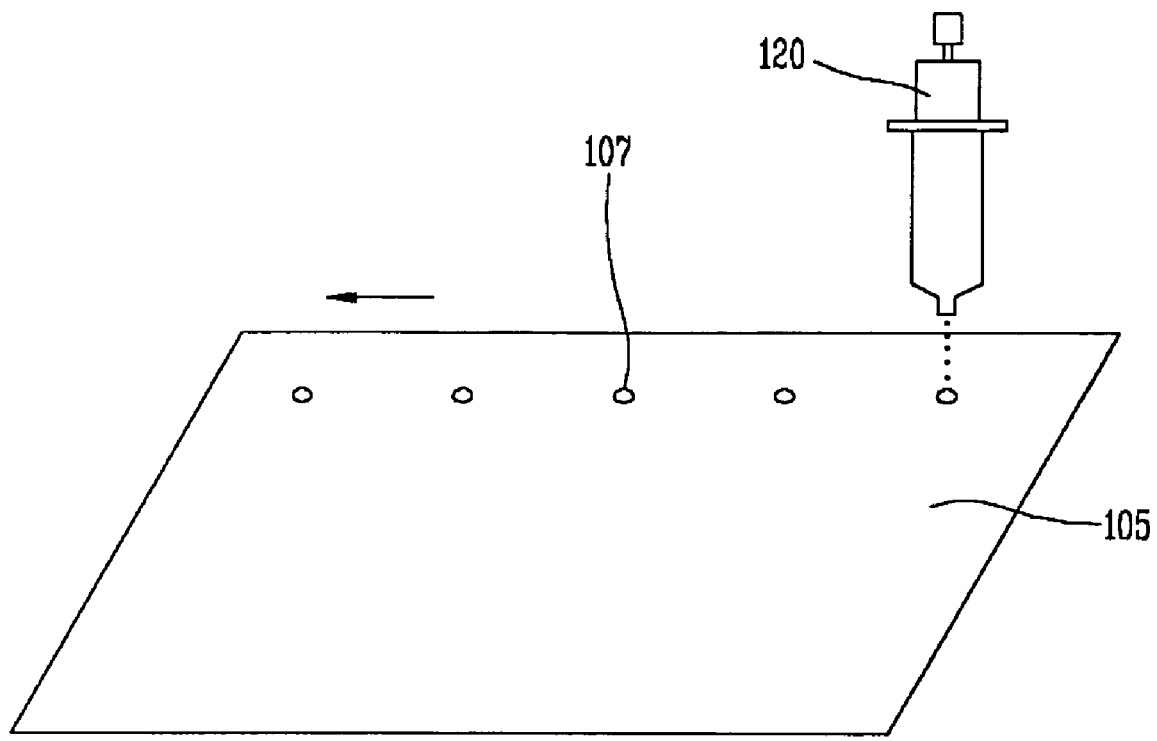
FIG. 6 illustrates a liquid crystal dispensing method.

FIG. 6 illustrates a liquid crystal dispensing method in accordance with principles of the present invention.

Referring to FIG. 6, the liquid crystal dispensing apparatus may be arranged above the lower substrate 105 (e.g., a glass substrate). Further, droplets of liquid crystal material 107 may be dispensed from the liquid crystal dispensing apparatus 120.

In one aspect of the present invention, droplets of liquid crystal 107, spaced apart from each other at predetermined distances, may be formed by fixing a position of the lower substrate 105, moving the liquid crystal dispensing apparatus 120 along x- and y-directions at a predetermined speed, and causing the liquid crystal dispensing apparatus 120 to discharge predetermined amounts of liquid crystal material within predetermined time intervals onto the lower substrate 105. Due to the movement and possible vibration of the liquid crystal dispensing apparatus 120, the liquid crystal droplets 107 may be undesirably misshapen, contain more or less liquid crystal material than the predetermined droplet amount, and not be aligned with predetermined dispensing positions. To cure such potential defects, and in an alternate aspect of the present invention, liquid crystal droplets 107, spaced apart from each other at predetermined distances, may be formed by fixing a position of the liquid crystal dispensing apparatus 120, moving the substrate 105 along x- and y-directions at a predetermined speed, and causing the liquid crystal dispensing apparatus 120 to discharge predetermined amounts of liquid crystal material within predetermined time intervals onto the lower substrate 105.

Figure 7:
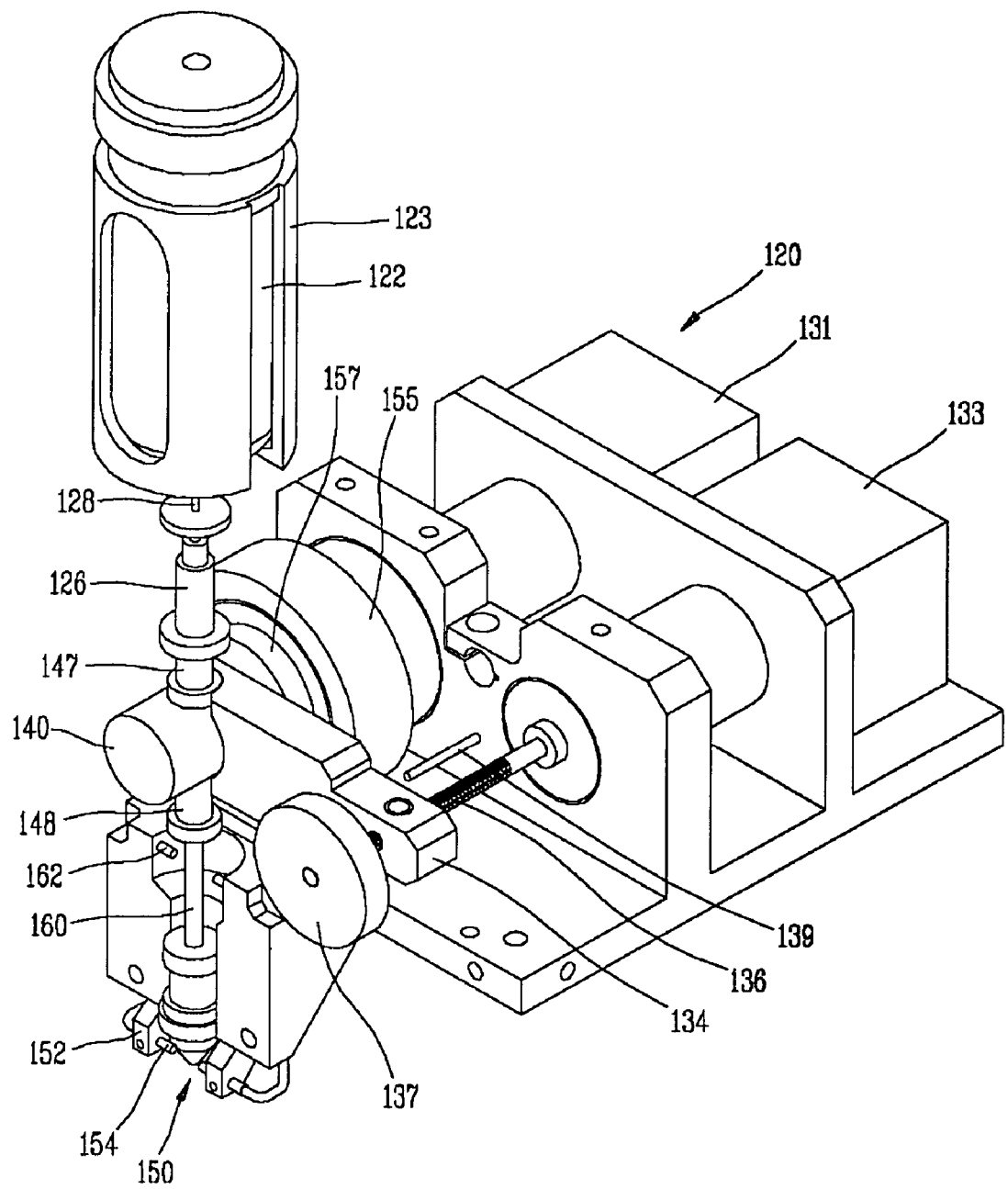
FIG. 7 illustrates a perspective view of a liquid crystal dispensing apparatus according to principles of the present invention.
Figure 8:
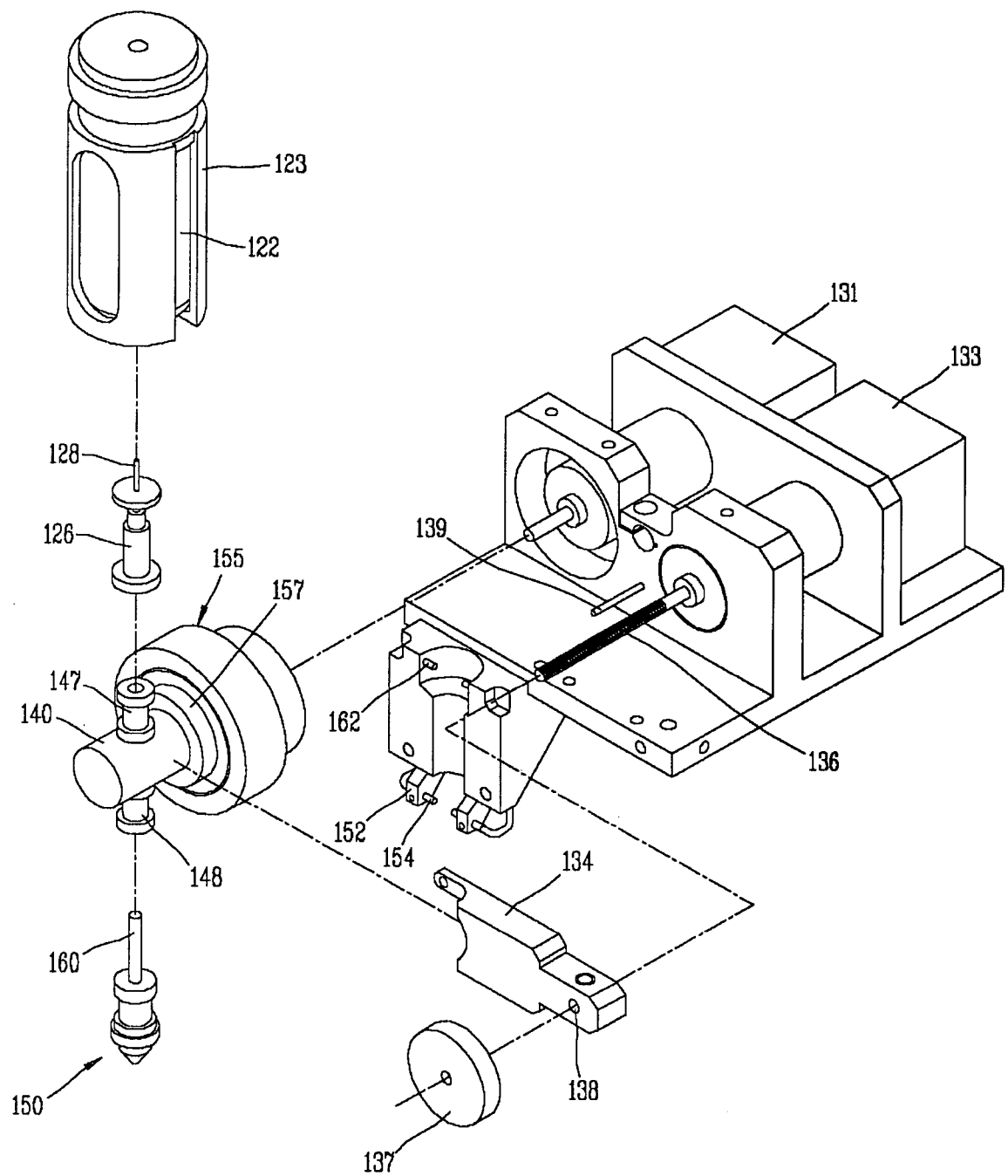
FIG. 8 illustrates an exploded perspective view of the liquid crystal dispensing apparatus shown in FIG. 7.

FIG. 7 illustrates a perspective view of a liquid crystal dispensing apparatus according to principles of the present invention. FIG. 8 illustrates an exploded perspective view of the liquid crystal dispensing apparatus shown in FIG. 7.

Referring to FIGS. 7 and 8, the liquid crystal dispensing apparatus 120 of the present invention may, for example, include a container 122 that contains liquid crystal material. Accordingly, the liquid crystal droplets 107 may, for example, be dispensed from liquid crystal material contained within the container 122.

In one aspect of the present invention, the container 122 may, for example, be cylindrically shaped. In another aspect of the present invention, the container 122 may be formed of an easily deformable material (e.g., polyethylene, or the like).

According to principles of the present invention, the liquid crystal droplets may be imprecisely dispensed onto a substrate if the container 122 deforms during the dispensing. Accordingly, the container 122, provided as described above, may be accommodated within a case 123, wherein the case 123 may, for example, be formed of a material that is relatively difficult to deform compared to the material from which the container 122 is formed (e.g., stainless steel, or the like). Alternatively, the container 122 itself may be formed of a material that does not easily deform (e.g., stainless steel, or the like) and the necessity of the case 123 may be eliminated altogether, thereby reducing the complexity and overall cost of the liquid crystal dispensing apparatus 120.

In one aspect of the present invention, the container 122 may be formed of a material that is substantially inert with respect to the liquid crystal material (e.g., polyethylene, or the like). In another aspect of the present invention, however, the container 122 may be formed of any structurally suitable material and the interior walls of the container 122 may be coated with a material such as a fluorine resin to prevent liquid crystal material contained therein from chemically reacting with sidewalls of the container 122.

A gas supply tube (not shown) may be arranged at an upper portion of the container 122 to transport an inert gas (e.g., nitrogen) into portions of the container 122 that are not occupied by the liquid crystal material contained therein. In one aspect of the present invention, the gas may be used to pressurize the container 122, facilitating the liquid crystal material contained therein to be dispensed onto the substrate.

According to principles of the present invention, a liquid crystal discharge pump 140 may be arranged at a lower portion of the container 122. The liquid crystal discharge pump 140 may be used to discharge predetermined amounts of liquid crystal material, contained within the container 122, onto a substrate. Therefore, a liquid crystal suction opening 147 may, for example, be formed at an upper portion of the liquid crystal discharge pump 140 and a liquid crystal discharge opening 148 may, for example, be formed at a lower portion of the liquid crystal discharge pump 140. During an operation of the liquid crystal dispensing apparatus 120, the liquid crystal suction opening 147 may, for example, convey liquid crystal material drawn from the container 122 into the liquid crystal discharge pump 140. Similarly, during an operation of the liquid crystal dispensing apparatus 120, the liquid crystal discharge opening 148 may, for example, convey liquid crystal material discharged from the liquid crystal discharge pump 140 to a nozzle 150.

According to principles of the present invention, a first connecting tube 126 may be coupled to the liquid crystal suction opening 147. In one aspect of the present invention, the liquid crystal suction opening 147 may be coupled to the first connecting tube 126 by being inserted into the first connecting tube 126. In another aspect of the present invention, the liquid crystal suction opening 147 may be coupled to the first connecting tube 126 via a coupling means (e.g., a screw, or the like). In still another aspect of the present invention, the liquid crystal suction opening 147 may be integrally formed with the first connecting tube 126.

According to principles of the present invention, a hollow pin 128 (e.g., an injection needle) may be formed at one side of the first connecting tube 126 and a pad (not shown), formed of a highly compressible material and capable of forming a hermetic seal (e.g., silicon, butyl rubber material, or the like), may be arranged at a lower portion of the container 122. According to principles of the present invention, the pin 128 may be inserted through the pad and into the container 122. Upon insertion of the pin 128, the pad presses against the outside wall the pin 128, preventing liquid crystal material from leaking outside of the pin 128, and liquid crystal material contained within the container 122 may be transported into the liquid crystal suction opening 147. Because the liquid crystal suction opening 147 and the container 122 are coupled to each other via the pin/pad structure discussed above, the liquid crystal suction opening 147 may be simply coupled and decoupled to the container 122.

According to principles of the present invention, the nozzle 150 may be connected to the liquid crystal discharge opening 148 via a second connecting tube 160 to facilitate the dispensing of liquid crystal material discharged from the liquid crystal discharge pump 140 onto the substrate. In one aspect of the present invention, the second connecting tube 160 may be formed of an opaque material. However, liquid crystal material contained within the liquid crystal material container 122 may, at some point, contain vapor (e.g., in the form of bubbles). For example, vapor may be introduced into the liquid crystal material at the liquid crystal discharge pump 140. The presence and amount of vapor cannot precisely controlled nor can it be completely removed before the liquid crystal material is dispensed onto the substrate, even if a vapor removing device is employed. When the liquid crystal material contains vapor, the dispensing positions and dispensing amounts of droplets of dispensed liquid crystal material cannot be precisely controlled and a defective LCD panel can be potentially fabricated. Therefore, one way to prevent the dispensing positions and dispensing amounts from being imprecisely controlled is to stop the operation of the liquid crystal dispensing apparatus as soon as it is determined that vapor is present. Accordingly, and in an alternative aspect of the present invention, the second connecting tube 160 may be formed of a suitably transparent material, enabling a suitable visual inspection to determine the presence of vapor contained within the liquid crystal material and ensuring that dispensing positions and dispensing amounts may be precisely controlled. A first sensor 162 (e.g., a photo coupler, or the like) may be arranged at opposing sides of the second connecting tube 160 to detect the presence of vapor within the discharged liquid crystal material.

According to principles of the present invention, a protection unit 152 may be arranged at a lower portion of the nozzle 150 to protect opposing sides of the nozzle 150 from external stresses, etc. Further, a second sensor 154 may be arranged at the protection unit 152 to detect the presence of vapor within the liquid crystal material dispensed from the nozzle 150 and/or to detect the presence of liquid crystal material accumulated on the surface of the nozzle 150 (i.e., residual liquid crystal material). In one aspect of the present invention, the second sensor 154 may be provided as, for example, a photo coupler, or the like.

The liquid crystal dispensing apparatus according to the principles of the present invention is capable of precisely controlling the amount of liquid crystal material dispensed through a nozzle 150 and onto a substrate by, as will be discussed in greater detail below, varying a fixation angle of the liquid crystal discharge pump 140 and by driving the liquid crystal discharge pump 140. However, the actual amount of liquid crystal material dispensed within each liquid crystal droplet may deviate from a predetermined amount when residual liquid crystal material is accumulated on the surface of the nozzle 150. Usually, the residual liquid crystal material is accumulated because the nozzle 150 is formed of a metal such as stainless steel. Stainless steel has a high wetability (i.e., has a high surface energy/is highly hydrophilic) with respect to liquid crystal material. Therefore, the contact angle (i.e., the angle formed when a liquid is in thermodynamic equilibrium with the surface of a solid) formed between the nozzle 150 and the liquid crystal material is low and, therefore, liquid crystal material spreads over the surface of nozzle 150. Because the liquid crystal material spreads over the nozzle 150, the amount of liquid crystal material actually dispensed onto the substrate as a liquid crystal droplet is less than the predetermined amount, increasing the likelihood of defectively fabricating an LCD panel. Moreover, as the dispensing operation is repeated, portions of the accumulated residual liquid crystal material may be dispensed with liquid crystal material discharged from the liquid crystal discharge pump 140, causing the amount of liquid crystal material actually dispensed onto the substrate as a droplet to be greater than the predetermined dispensing amount and, again increasing the likelihood of defectively fabricating an LCD panel.

Therefore, to reduce the accumulation of residual liquid crystal material on the surface of the nozzle 150, a material having a low wetability (i.e., a low surface energy/highly hydrophobic) with respect to the liquid crystal material and forming a large contact angle with liquid crystal material (e.g., fluorine resin, or the like), may be deposited on the surface of the nozzle 150 by any suitable method (e.g., dipping, spraying, or the like). Alternatively, the nozzle 150 may be completely formed from the material having a low wetability with respect to the liquid crystal material (e.g., fluorine resin, or the like). Such nozzle 150 may thus be used once or multiple times. By providing the nozzle 150 with the material having the low wetability, less liquid crystal material may spread over the surface of the nozzle 150 and more liquid crystal material may be dispensed onto the substrate through the nozzle 150. As a result, the amount of liquid crystal material actually dispensed onto the substrate as a liquid crystal droplet may be substantially equal to the predetermined amount.

According to principles of the present invention, the liquid crystal discharge pump 140 may be coupled to (e.g., inserted into) a rotating member 157. The rotating member 157 may be fixed to a fixing unit 155 and coupled to a first motor 131. Therefore, as the first motor 131 is operated, the rotating member 157 rotates which, in turn, causes the liquid crystal discharge pump 140 to dispense liquid crystal material contained within the liquid crystal container 122 onto a substrate.

According to principles of the present invention, the amount of liquid crystal material discharged from the liquid crystal material container 122 via the liquid crystal discharge pump 140 may be varied in accordance with a fixation angle between the liquid crystal discharge pump 140 and the rotating member 157 (i.e., the angle at which a portion of the liquid crystal discharge pump 140 is fixed to the rotating member 157). Therefore, the liquid crystal discharge pump 140 may, for example, contact a first end of a bar shaped liquid crystal capacity amount controlling member 134. A hole 138 may be formed at a second end of the liquid crystal capacity amount controlling member 134 and a rotational shaft 136 may be inserted into the hole 138. A first end of the rotational shaft 136 may be connected to a second motor 133 and a second end of the rotational shaft 136 may be connected to an angle controlling lever 137. The rotational shaft 136 may be rotated either automatically upon driving the second motor 133 or manually upon operating the angle controlling lever 137. A screw (not shown) may be formed at a periphery of the hole 138 and the rotational shaft 136 so as to couple the liquid crystal capacity amount controlling member 134 to the rotational shaft 136. Upon rotating the rotational shaft 136, the second end of the liquid crystal capacity amount controlling member 134 may move along a linear axis of the rotational shaft 136, wherein the direction of the rotating determines the direction in which the second end of the liquid crystal capacity amount controlling member 134. As a result of the movement of the second end of the liquid crystal capacity amount controlling member 134, the fixation angle may be varied.

Accordingly, the first motor 131 may operate to cause the liquid crystal discharge pump 140 to dispense liquid crystal material from the liquid crystal material container 122 onto the substrate while the second motor 133 may operate to control the fixation angle and thus to control the amount of liquid crystal material dispensed by the liquid crystal discharge pump 140 during its operation.

According to principles of the present invention, dispensing amounts of droplets of liquid crystal material are very minute. Further, variations in the dispensing amounts are also very minute. Therefore, minute variations in the fixation angle must be precisely controlled. To effect such precise control in the fixation angle, the second motor 133 may be provided as a step motor operated by a pulse input value, a servo motor, or the like.

Figure 9A:
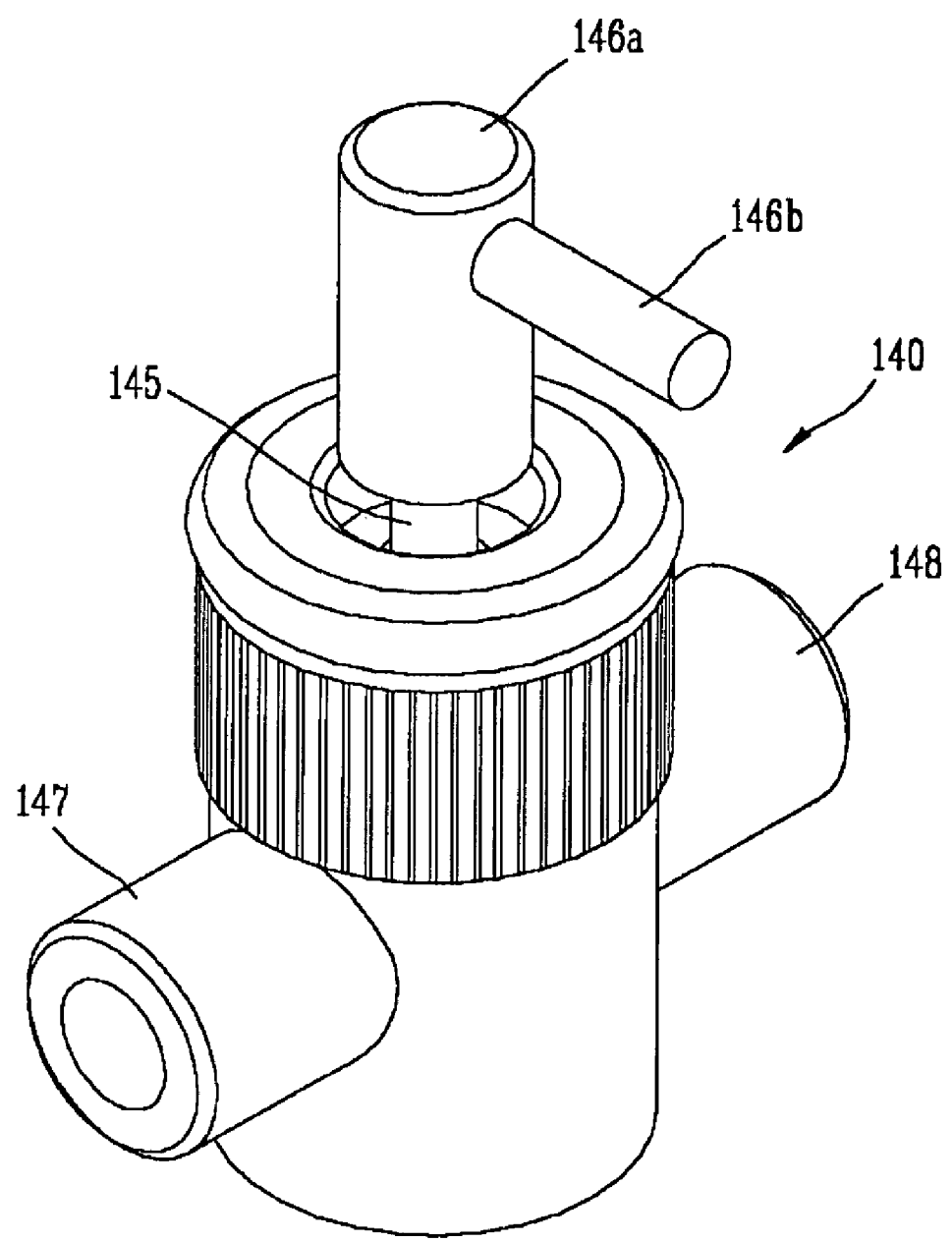
FIG. 9A illustrates a perspective view of a liquid crystal discharge pump of the liquid crystal dispensing apparatus according to principles of the present invention.
Figure 9B:
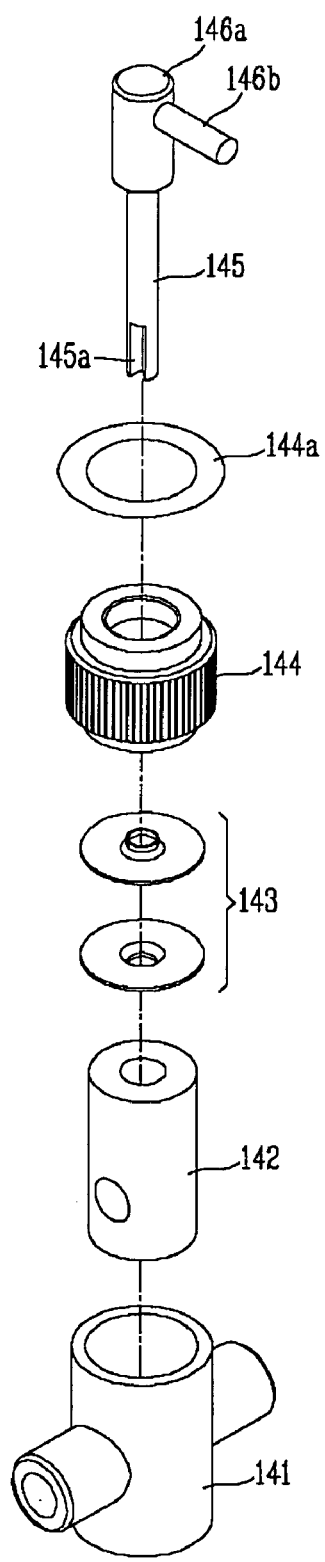
FIG. 9B illustrates an exploded perspective view of the liquid crystal discharge pump shown in FIG. 9A.

FIG. 9A illustrates a perspective view of a liquid crystal discharge pump of the liquid crystal dispensing apparatus according to principles of the present invention. FIG. 9B illustrates an exploded perspective view of the liquid crystal discharge pump shown in FIG. 9A.

Referring to FIGS. 9A and 9B, the liquid crystal discharge pump 140 of the present invention may, for example, include a case 141, wherein the case 141 includes the liquid crystal suction and discharge openings 147 and 148, respectively; a cap 144 coupled to the case 141, wherein an upper portion of the cap 144 includes an opening; a cylinder 142 arranged within the case 141 for conveying liquid crystal material drawn from the container 122; a sealing means 143 for sealing the cylinder 142; an o-ring 144a arranged at an upper portion of the cap 144 for preventing liquid crystal material from leaking outside the liquid crystal discharge pump 140; a piston 145 arranged within the cylinder 142 through the opening of cap 144, the piston 145 being rotatable and axially translatable within the cylinder 142 (e.g., along the vertical axis as illustrated in FIGS. 9A and 9B) for drawing in and discharging liquid crystal material through the liquid crystal suction opening 147 and the liquid crystal discharge opening 148, respectively; a head 146a arranged at an upper portion of the piston 145 and fixed to the rotating member 157; and a bar 146b arranged at the head 146a. In one aspect of the present invention, the bar 146b may be inserted within a hole (not shown) of the rotating member 157. Accordingly, the piston 145 may rotate when the rotating member 157 is rotated by the first motor 131.

Referring to FIG. 9B, a groove 145a may be formed at an end portion of the piston 145. In one aspect of the present invention, the groove 145a may occupy no more than about 25% of a cross-sectional area of the piston 145. In another aspect of the present invention, the groove 145a may open and close the liquid crystal suction opening 147 and the liquid crystal discharge opening 148 upon rotating the piston 145 to draw in and discharge liquid crystal material through the liquid crystal suction opening 147 to the liquid crystal discharge opening 148.

An exemplary operation of the liquid crystal discharge pump 140 will now be explained in greater detail below with reference to FIG. 10.

Figure 10:
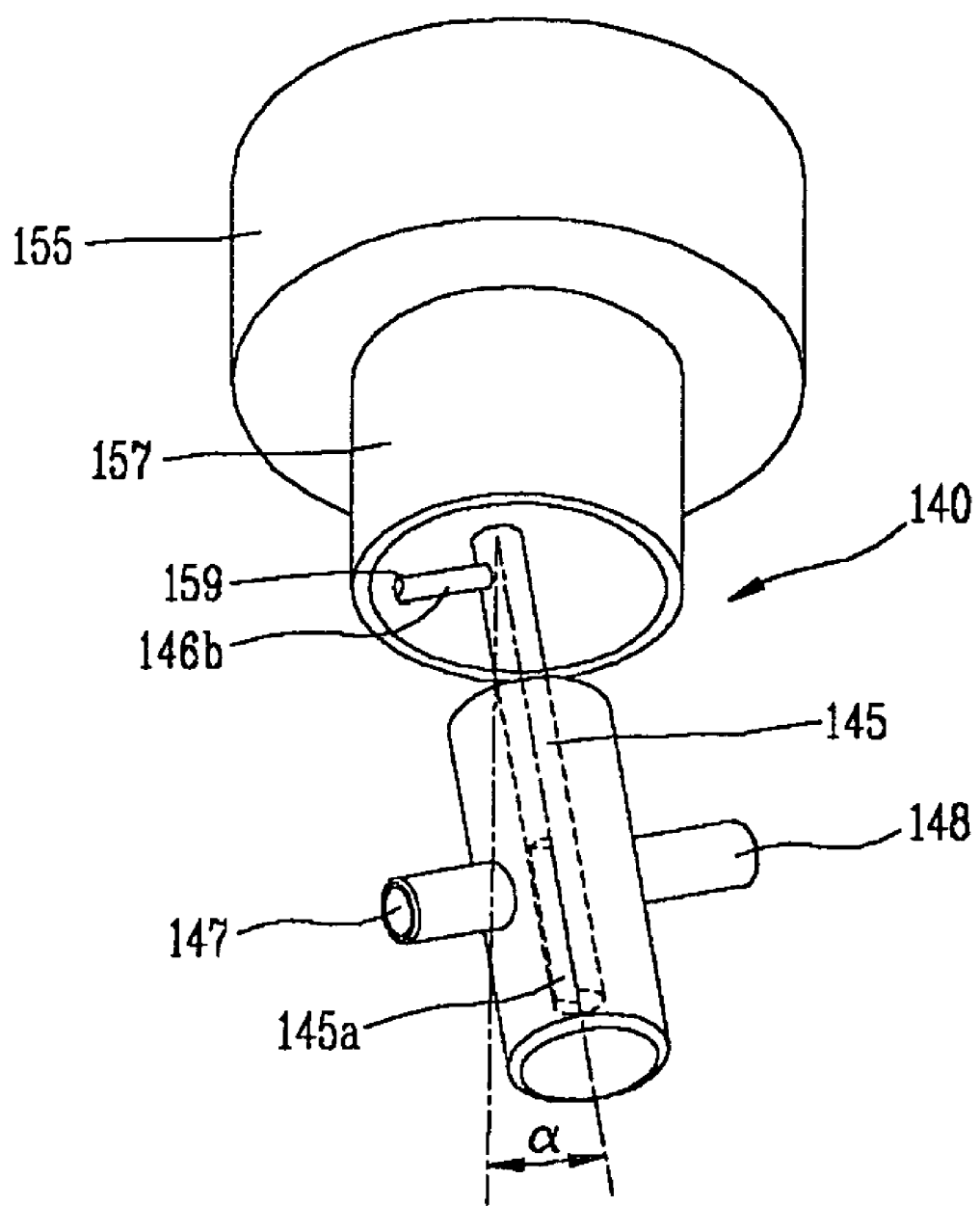
FIG. 10 illustrates a view of the liquid crystal discharge pump fixed to a rotating member at a fixation angle.

Referring to FIG. 10, the piston 145 of the liquid crystal discharge pump 140 may be fixed to the rotating member 157 at a predetermined angle, $\alpha$ (i.e., the fixation angle). For example, the bar 146b formed at the piston head 146a may be inserted into a hole 159 formed within the rotating member 157 to fix the piston 145 to the rotating member 157. Because the bar 146b is fixed within the hole 159, the piston 145 rotates as the rotating member 157 rotates. A bearing (not shown) may be provided within the hole 159 to allow the bar 146b of the piston 145 to move in back and forth and right and left directions with respect to the hole 159. Upon operating the first motor 131, the rotating member 157 may be rotated and to rotate piston 145 fixed thereto.

If the fixation angle (α) is 0°, the piston 145 rotates only about the axis of the rotating member 157. However, if the fixation angle (α) of the piston 145 is substantially not 0°, the piston 145 may rotate about an off-axis angle with respect to the rotating member 157 (e.g., transverse and longitudinal rotation).

For example, the piston 145 may be rotated a predetermined amount within an interior space of the cylinder 142 to allow liquid crystal material within the liquid crystal suction opening 147 to be drawn into the cylinder 142. Upon rotating the piston 145 within the cylinder 142 further, liquid crystal material drawn into the cylinder 142 may be discharged into the liquid crystal discharge opening 148. To facilitate the aforementioned drawing-in (or suction) and discharge operations, the groove 145a may be selectively arranged to be in fluid communication with the liquid crystal suction and discharge openings 147 and 148, as will be discussed in greater detail with respect to FIGS. 11A to 11D.

Figure 11A:
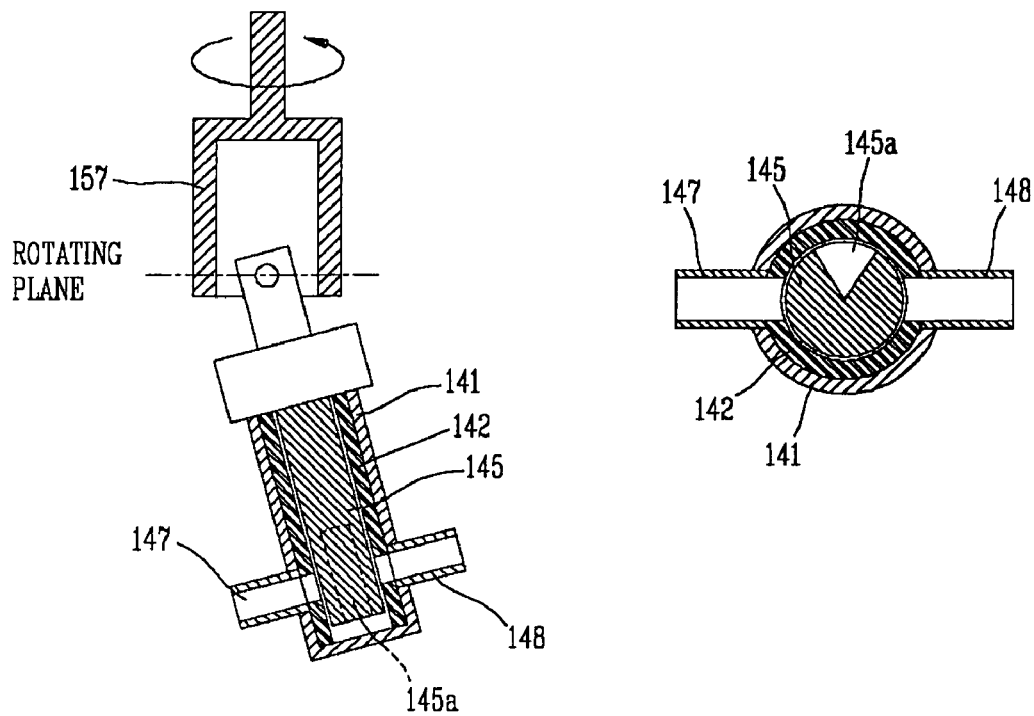
FIGS. 11A to 11D operational views of the liquid crystal discharge pump according to principles of the present invention.
Figure 11B:
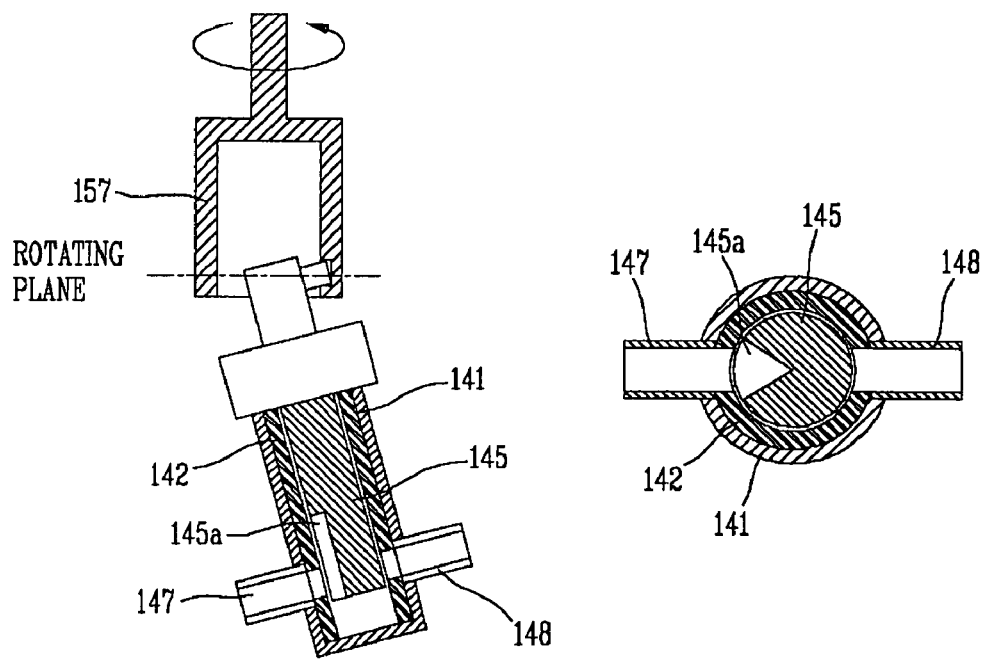
Figure 11C:
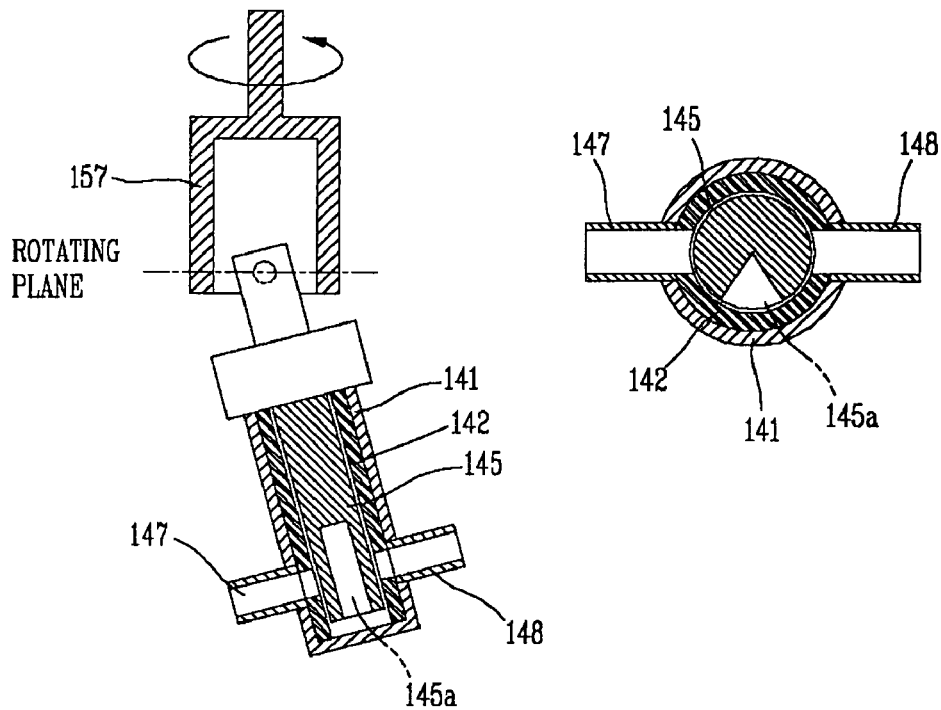
Figure 11D:
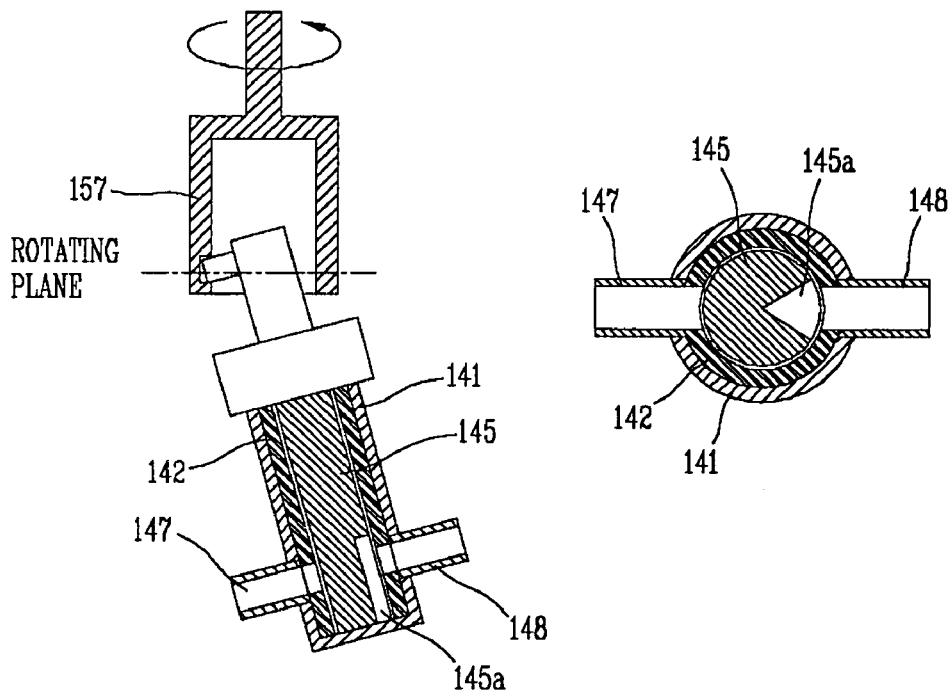

Referring generally to FIGS. 11A to 11D, liquid crystal material contained within the liquid crystal material container 122 is discharged to the nozzle 150 through four strokes of the liquid crystal discharge pump 140. FIGS. 11A and 11C illustrate cross strokes, FIG. 11B illustrates a suction stroke at the liquid crystal suction opening 147, and FIG. 11D illustrates a discharge stroke at the liquid crystal discharge opening 148.

Referring specifically to FIG. 11A, the piston 145, fixed to the rotating member 157 at the fixation angle (α), rotates in accordance with the rotation of the rotating member 157. In the cross stroke shown in FIG. 11A, both the liquid crystal suction opening 147 and the liquid crystal discharge opening 148 are closed by the piston 145.

Upon rotating the rotating member 157 approximately 45°, the piston 145 rotates within the cylinder 142 to arrange the groove 145a to be in fluid communication with the liquid crystal suction opening 147, as shown in FIG. 11B. Because the piston 145 is fixed to the rotating member 157 at a predetermined fixation angle, the bar 146b rotates along the plane in which the rotating member 157 rotates while the piston 145 moves axially out of the cylinder 142 and rotates within the cylinder 142 to arrange the groove 145a in fluid communication with the liquid crystal suction opening 147. Upon arranging the groove 145a to be in fluid communication with the liquid crystal suction opening 147, liquid crystal material within the liquid crystal suction opening 147 is drawn into the cylinder 142 and groove 145a. The suction stroke illustrated in FIG. 11B, arranging the groove 145a in fluid communication with the liquid crystal suction opening 147, thus 'opens' the liquid crystal suction opening 147.

Upon further rotating the rotating member 157 approximately 45°, the piston 145 rotates within the cylinder 142 to arrange the groove 145a between the liquid crystal suction and discharge openings 147 and 148, as shown in FIG. 11C. The cross stroke illustrated in FIG. 11C, arranging the groove 145a between the liquid crystal suction and discharge openings 147 and 148, thus 'closes' the liquid crystal suction opening 147.

Upon further rotating the rotating member 157 approximately 45°, the piston 145 moves axially into the cylinder 142 and rotates within the cylinder 142 to arrange the groove 145 to be in fluid communication with the liquid crystal discharge opening 148, as shown in FIG. 11D. Upon arranging the groove 145a to be in fluid communication with the liquid crystal discharge opening 148, liquid crystal material is discharged from the cylinder 142 and groove 145a into the liquid crystal discharge opening 148. The discharge stroke illustrated in FIG. 11D, arranging the groove 145a to be in fluid communication with the liquid crystal discharge opening 148, thus 'opens' the liquid crystal discharge opening 148.

As described above, the liquid crystal discharge pump 140 repeats four consecutive strokes (i.e., the first cross stroke, the suction stroke, the second cross stroke, and the discharge stroke), to discharge the liquid crystal material, contained in the liquid crystal material container 122, to the nozzle 150. According to principles of the present invention, the amount of liquid crystal material discharged by the liquid crystal discharge pump 140 may be varied according to the fixation angle, α, regulating the degree to which the piston 145 rotates off the axis of the rotating member 157 and thus regulating the degree to which the piston 145 moves along the axis of the cylinder 142.

Figure 12:
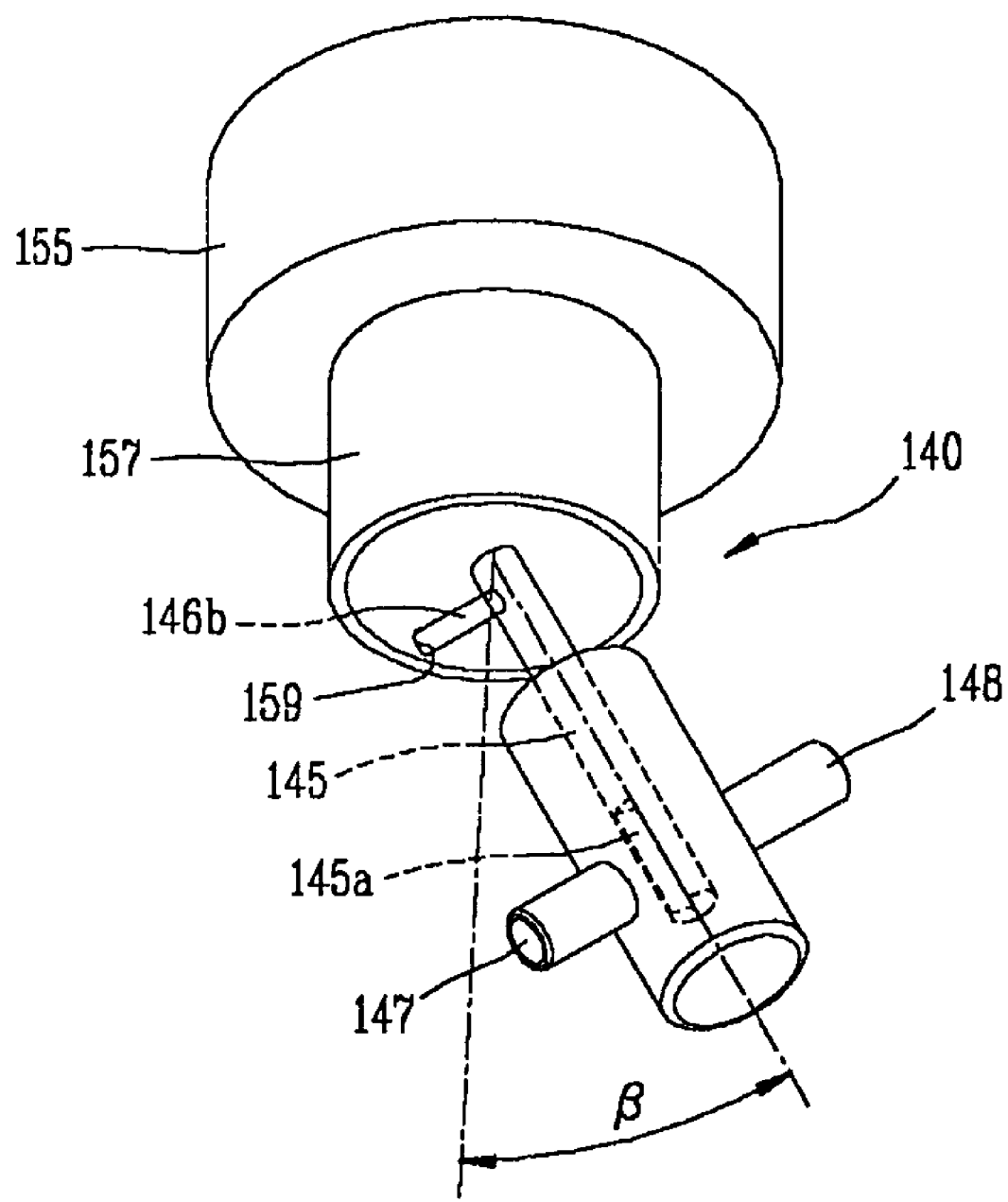
FIG. 12 illustrates a view of the liquid crystal discharge pump fixed to a rotating member at an increased fixation angle.

FIG. 12 illustrates a view the liquid crystal discharge pump fixed to the rotating member at a predetermined angle β.

As described above with respect to FIG. 10, the liquid crystal discharge pump 140 shown in FIG. 10 may be fixed to the rotating member 157 at a fixation angle α. However, as shown in FIG. 12, the liquid crystal discharge pump 140 may be fixed to the rotating member 157 at a fixation angle of β, wherein β>α. Accordingly, the degree of off-axis rotation of piston 145, with respect to the rotating member 157 shown in FIG. 12 may be greater than the degree of off-axis rotation of piston 145 shown in FIG. 10. Accordingly, as the fixation angle increases, the degree to which the piston 145 is axially translated along the axis of the cylinder 142 increases, thereby increasing the amount of liquid crystal material that may be drawn into, and discharged from, the cylinder 142 per revolution of the rotating member 157.

Therefore, the principles of the present invention allow the amount of liquid crystal material discharged to be controlled by adjusting the fixation angle. In one aspect of the present invention, the fixation angle may be controlled by the liquid crystal capacity amount controlling member 134 shown in FIG. 7. In another aspect of the present invention, the liquid crystal capacity amount controlling member 134 may be moved by driving the second motor 133. Therefore, the fixation angle may be controlled by adjusting the second motor 133. Alternatively, the fixation angle may be controlled by manually adjusting the angle controlling lever 137.

In one aspect of the present invention, the fixation angle of the liquid crystal discharge pump 140 may be measured by a sensor 139. In another aspect of the present invention, the sensor 139 may include a linear variable differential transformer. Accordingly, if the fixation angle exceeds a predetermined angle, the sensor 139 may communicate an alarm to a user, preventing the liquid crystal discharge pump 140 from being damaged.

According to principles of the present invention, the first and/or second motors 131 and 133 may be connected to a control unit (not shown) via wired or wireless means. In one aspect of the present invention, the control unit may determine (e.g., calculate) a total amount of liquid crystal material to be dispensed onto an LCD panel region using predetermined input information. As used herein, the term "LCD panel region" will indicate the particular area of a base substrate from which an LCD panel will be eventually formed. In another aspect of the present invention, the control unit may compensate (i.e., adjust), in real time, the total amount of liquid crystal material dispensed onto the LCD panel region. In still another aspect of the present invention, the control unit may, for example, control an operation of the first and second motors 131 and 133.

According to principles of the present invention, the amount of liquid crystal material dispensed onto an LCD panel region of a substrate may, for example, correspond to the height of a spacer (i.e., spacer height) incorporated within the subsequently formed LCD panel. Ball spacers are typically incorporated within LCD panels fabricated according to the aforementioned dipping and vacuum injection methods. Patterned (e.g., column) spacers, however, are incorporated within LCD panels fabricated according to the aforementioned liquid crystal dispensing method because the liquid crystal dispensing method fabricates relatively large LCD panels. Specifically, it is relatively difficult to uniformly disperse ball spacers onto a substrate used in forming relatively large LCD panels because ball spacers tend to agglomerate over the area of the relatively large LCD panel. Such agglomeration increases the likelihood that an LCD panel having an inferior (e.g., non-uniform) cell gap will be formed. Patterned spacers, however, are formed at predetermined positions and can, therefore, be used to maintain the uniformity cell gap of relatively large LCD panels.

As the height of a patterned spacer, formed on a color filter substrate, for example, increases, the width, and thus the volume, of the cell gap of the LCD panel increases. Therefore, if the volume of the cell gap exceeds the volume occupied by a predetermined amount of liquid crystal material dispensed on the LCD panel region, the LCD panel will contain a deficient amount of liquid crystal material and exhibit defective display characteristics (e.g., a normally black mode LCD panel will not effectively display black and a normally white mode LCD panel will not effectively display white). If, on the other hand, the volume of liquid crystal material dispensed on the LCD panel region exceeds the volume of the cell gap of the LCD panel, the LCD panel will contain an excessive amount of liquid crystal material and induce a gravitation inferiority. For example, as the temperature of the liquid crystal material increases, the volume of the liquid crystal material increases, thereby causing the width of the cell gap to be uneven, causing liquid crystal material to move downwardly by gravity, and degrading the quality of the LCD panel.

To solve the problems discussed above, the control unit may determine the total amount of liquid crystal material to be dispensed onto an LCD panel region based on input information. Further, the control unit may compensate (i.e., adjust) the total amount of liquid crystal material dispensed onto the LCD panel region based on, for example, the spacer height of a spacer defining the cell gap of the LCD panel.

According to principles of the present invention, the spacer height may, for example, be input to the control unit during a spacer forming process incorporated within either of the aforementioned TFT array or color filter substrate forming processes. In one aspect of the present invention, the spacer forming process may form a spacer having a predetermined spacer height that does not need to be measured. In another aspect of the present invention, the spacer height may be measured in a spacer height measuring process. A spacer height measuring process may, for example, include providing a spacer height measuring means to measure the height of the spacer after the spacer forming process (e.g., during the TFT array substrate or color filter substrate forming process) and before the liquid crystal dispensing process.

Figure 13:
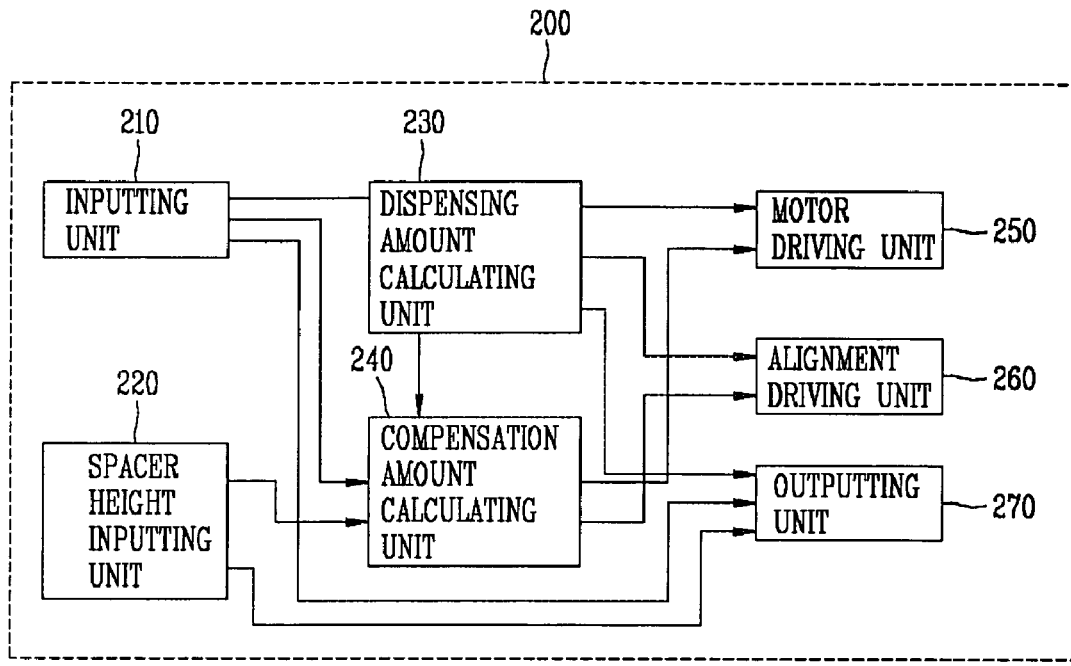
FIG. 13 illustrates a block diagram of a control unit of a liquid crystal dispensing apparatus according to principles of the present invention.

FIG. 13 illustrates a block diagram of a control unit of a liquid crystal dispensing apparatus according to principles of the present invention.

Referring to FIG. 13, the aforementioned control unit 200 may, for example, include a spacer height inputting unit 220 for inputting a spacer height of a spacer formed on the LCD panel; an information inputting unit 210 for inputting information related generally to the formation of LCD panels (e.g., substrate area, the number of LCD panel regions formed on a substrate, a positions of LCD panel regions within the substrate, area of LCD panel regions, type of liquid crystal material to be dispensed, and viscosity of liquid crystal material to be dispensed, etc.); a dispensing amount calculating unit 230 for calculating an amount of liquid crystal material to be dispensed onto an LCD panel based, for example, on information output by the information inputting unit 220 (e.g., information relating to the LCD panel and the liquid crystal material); a dispensing amount compensating unit 240 for adjusting the calculated amount of liquid crystal material to be dispensed on the LCD panel based, for example, on the spacer height output by the spacer height inputting unit 220 and based on information output by the information inputting unit 210; a motor driving unit 250 for controlling an operation of the second motor 133 that controls the fixation angle of the liquid crystal discharge pump 140, enabling the adjusted amount of liquid crystal material to be dispensed; an alignment driving unit 260 for moving a substrate and/or the liquid crystal dispensing apparatus 120 to dispensing positions within an LCD panel region; and an outputting unit 270 for outputting information related generally to the LCD panels formed (e.g., number of LCD panels regions on the substrate, the size of the LCD panel region onto which liquid crystal material is currently being dispensed, an amount of liquid crystal material to be dispensed onto an LCD panel region, the current state of dispensing liquid crystal material, adjusted liquid crystal material dispensing amount, etc.). In one aspect of the present invention, the information and spacer height inputting units 210 and 220, respectively, may be variously connected to the dispensing amount and compensation amount calculating units 230 and 240, respectively, via wired or wireless means.

According to principles of the present invention, the dispensing amount calculating unit 230 may calculate an amount of liquid crystal material to be dispensed onto an LCD panel region based, for example, on information relating to the size of the LCD panel region and on information relating to particular characteristics of the liquid crystal material dispensed. Thus, the dispensing amount calculating unit 230 does not calculate the amount of liquid crystal material to be dispensed based on the characteristics of the glass substrate from which the LCD panel is formed. Rather, the dispensing amount calculating unit 230 calculates the amount of liquid crystal material to be dispensed based on the characteristics of an individual (i.e., unit) LCD panel.

Figure 14:
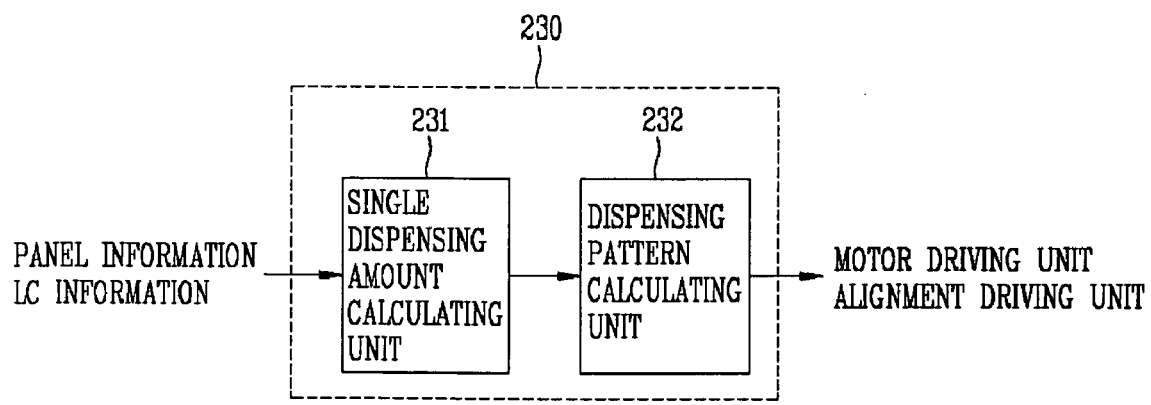
FIG. 14 illustrates a block diagram of a dispensing amount calculating unit according to principles of the present invention.

FIG. 14 illustrates a block diagram of a dispensing amount calculating unit according to principles of the present invention.

Referring to FIG. 14, the dispensing amount calculating unit 230 may, for example, include a single dispensing amount calculating unit 231 for calculating an amount of liquid crystal material to be dispensed onto an LCD panel as a single droplet of liquid crystal material (i.e., a droplet amount); and a dispensing pattern calculating unit 232 for detecting a position of the LCD panel region on which the calculated droplet amount is to be dispensed and thereby calculating a pattern of dispensed droplets of liquid crystal material (i.e., a dispensing pattern) on the LCD panel region. In one aspect of the present invention, the single dispensing amount calculating unit 231 may calculate the droplet amount based on information output by the information inputting unit 220 (e.g., information relating to the LCD panel and the liquid crystal material).

According to principles of the present invention, the dispensing pattern may be based, at least in part, on the extent to which the dispensed liquid crystal material spreads over the LCD panel region. The extent to which the liquid crystal material spreads may vary according to the cumulative effect of a number of factors such as an alignment direction of an alignment layer formed on an LCD panel, a pattern of structures formed on the LCD panel (e.g., gate lines, data lines, pixel electrodes, common electrodes, color filters, etc.), the viscosity of the liquid crystal material dispensed, etc. Twisted nematic (TN) mode LCD panels include pixel and common electrodes formed within pixel regions and on lower and upper substrates, respectively, to oppose each other. In-plane switching (IPS) mode, however, include the pixel and common electrodes formed in parallel on the lower substrate. Due to the above-described difference in structures supported by the upper and lower substrates, the degree to which liquid crystal material spreads in TN mode LCD panels differs from the degree to which liquid crystal material spreads in IPS mode LCD panels. Accordingly, dispensing patterns, as calculated by the dispensing pattern calculating unit 232, may be different for TN mode LCD panels than for IPS mode LCD panels.

Figure 15A:
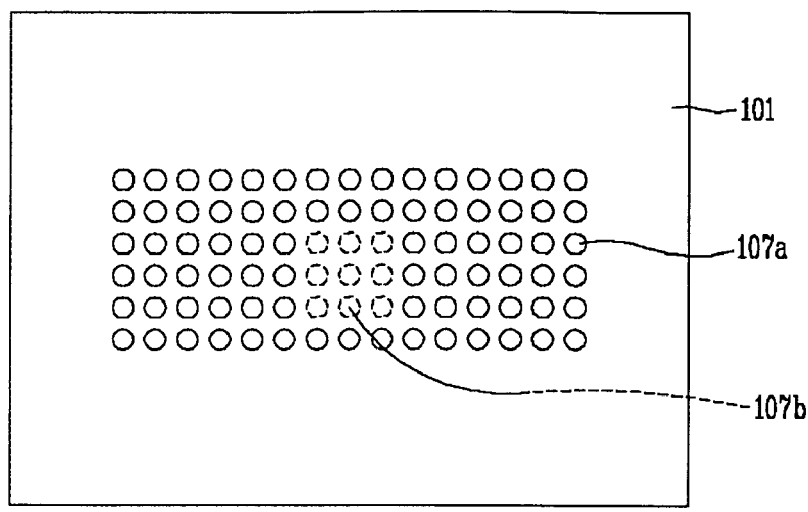
FIGS. 15A to 15C illustrate dispensing patterns of liquid crystal droplets dispensed onto LCD panels having different modes of operation.
Figure 15B:
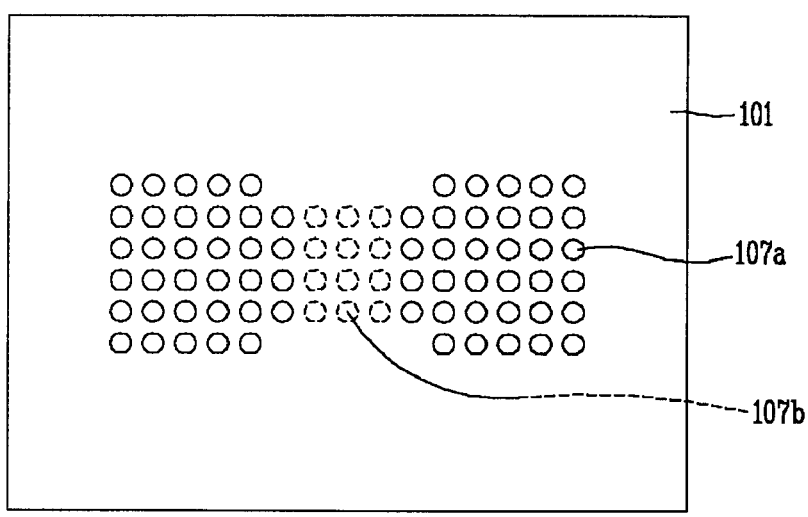
Figure 15C:
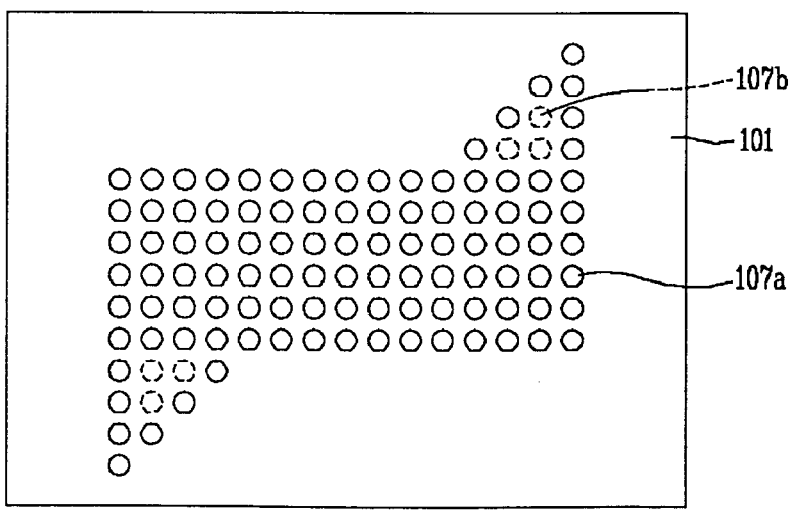

FIGS. 15A to 15C illustrate liquid crystal dispensing patterns of different modes of liquid crystal display panels.

Referring to FIG. 15A, a dispensing pattern of a TN mode LCD panel may, for example, comprise a rectangular pattern of droplets of liquid crystal material. Referring to FIG. 15B, a dispensing pattern of a TN mode or a vertical alignment (VA) mode LCD panel may, for example, comprise a dumbbell-shaped pattern of droplets of liquid crystal material. Referring to FIG. 15C, a dispensing pattern of an IPS mode LCD panel may, for example, comprise a lightning-shape pattern of droplets of liquid crystal material.

The dispensing patterns illustrated in FIGS. 15A to 15C may, for example, include a first group of liquid crystal droplet positions 107a and a second group of liquid crystal droplet positions 107b. In one aspect of the present invention, the first group of liquid crystal droplet positions 107a may constitute a predetermined dispensing pattern, as will be discussed in greater detail below, while the combination of the first and second groups of liquid crystal droplet positions 107a and 107b may constitute a compensated dispensing pattern, as will be discussed in greater detail below. Alternatively, the predetermined dispensing pattern may, for example, include the combination of the first and second groups of liquid crystal droplet positions 107a and 107b while the compensated dispensing position may, for example, include only the first group of liquid crystal droplet positions 107a.

Figure 16:
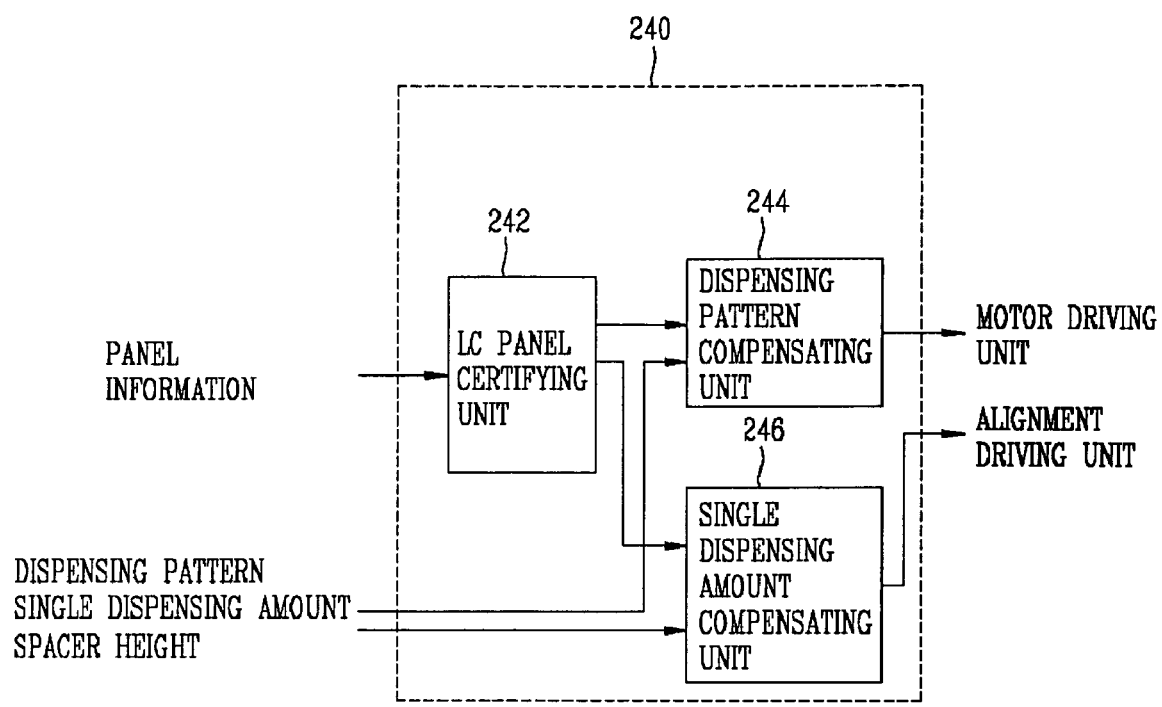
FIG. 16 illustrates a block diagram of a compensation amount calculating unit according to principles of the present invention.

FIG. 16 illustrates a block diagram of a compensation amount calculating unit according to principles of the present invention.

Referring to FIG. 16, the dispensing amount compensating unit 240 may, for example, include a liquid crystal panel certifying unit 242 for determining the size of an LCD panel region onto which liquid crystal material is to be dispensed based, for example, on information output by the information inputting unit 220 (e.g., information relating to the LCD panel); a dispensing pattern compensating unit 244 for adjusting a dispensing pattern calculated by the dispensing pattern calculating unit 232 in accordance with, for example, the output of the liquid crystal panel certifying unit 242 and a spacer height output by the spacer height inputting unit 220; and a single dispensing amount compensating unit 246 for adjusting a droplet amount output by the single dispensing amount calculating unit 231 in accordance with, for example, the output of the liquid crystal panel certifying unit 242.

In one aspect of the present invention, the liquid crystal panel certifying unit 242 may determine whether the LCD panel region onto which liquid crystal material is to be dispensed has, for example, a first or a second area, wherein the first area is larger than the second area. In another aspect of the present invention, the dispensing pattern calculating unit 232 may adjust the dispensing pattern calculated by the dispensing pattern calculating unit 232 in accordance with a spacer height output by the spacer height inputting unit 220 when the liquid crystal panel certifying unit 242 determines that the LCD panel region has the first area. In still another aspect of the present invention, the single dispensing amount compensating unit 246 may adjust the droplet amount output by the single dispensing amount calculating unit 231 when the liquid crystal panel certifying unit 242 determines that the LCD panel region has the second area.

As described above, the dispensing amount compensating unit 240 may adjust the total amount of liquid crystal material dispensed onto an LCD panel region by adjusting a dispensing pattern of droplets of liquid crystal material and by adjusting the amount of liquid crystal material containing within individual liquid crystal droplets. Accordingly, the principles of the present invention may be applied to the simultaneous fabrication of LCD panels having multiple sizes from the same substrate. By fabricating LCD panels of multiple sizes from the same substrate, the efficiency with which the substrate is used increases, thereby reducing the cost and time required to fabricate individual LCD panels. Thus, the principles of the present invention may be applied to the simultaneous fabrication of LCD panels employed in mobile electronic devices (e.g., mobile phones, notebook computers, etc.) but also to other electronic devices (e.g., monitors, televisions, etc).

Figure 17A:
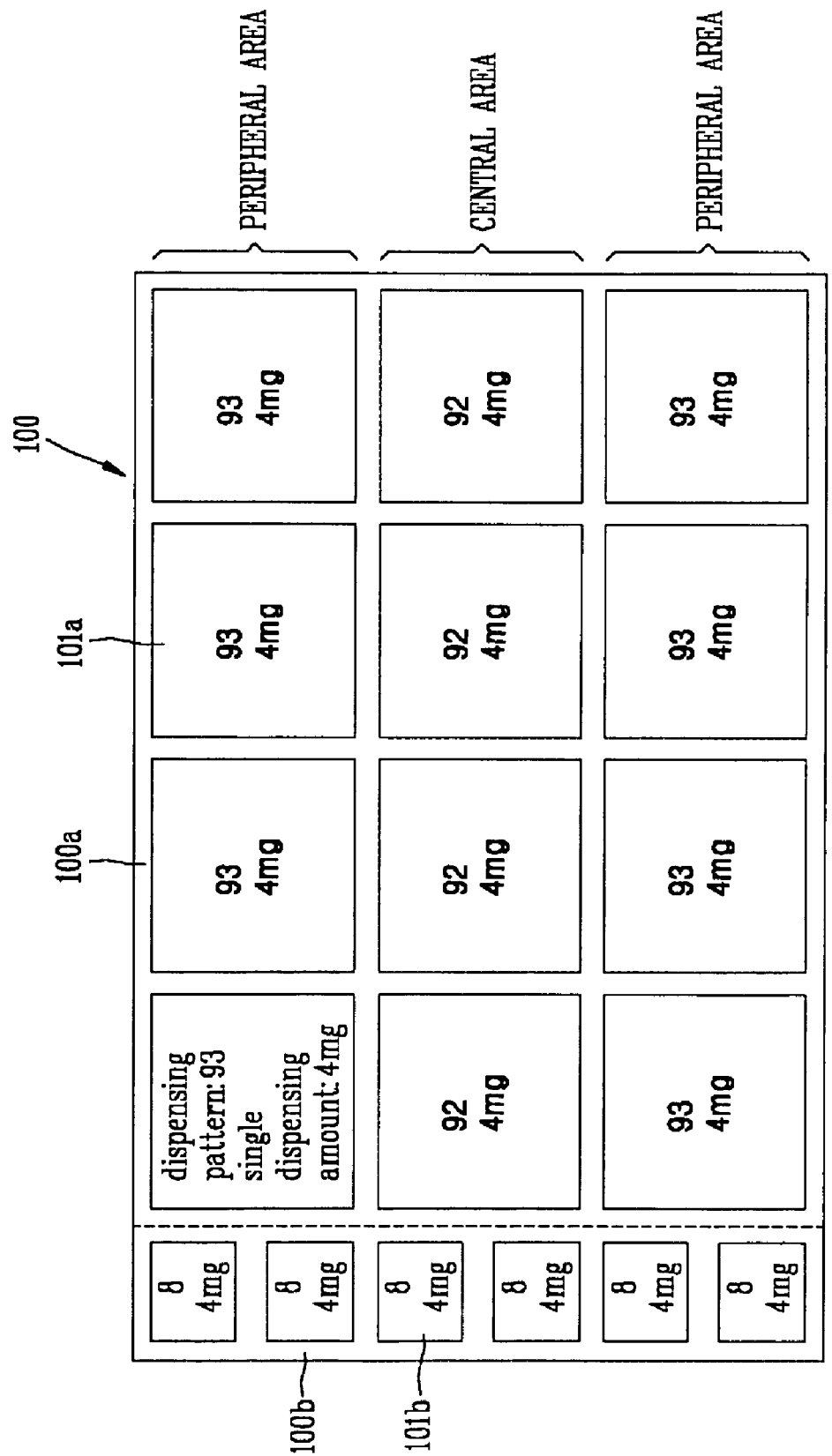

FIGS. 17A and 17B schematically illustrate exemplary combinations of dispensing patterns and droplet amounts in LCD panels distributed on a single substrate.

Referring to FIG. 17A, a substrate 100 maybe provided as, for example, a glass substrate and include a first and second regions 100a and 100b, respectively. In one aspect of the present invention, a plurality of first LCD panel regions 101a may formed within the first region 100a and a plurality of second LCD panel 101b regions may be formed within the second region 100b. In another aspect of the present invention, the first LCD panel regions 101a may be larger than the second LCD panel regions 101b.

As shown in FIG. 17A, a dispensing pattern characterized by a predetermined pattern of 92 liquid crystal droplets, each having a droplet amount of about 4 mg, may be formed on each first LCD panel region 101a arranged within a central area of the first region 100a. Further, a dispensing pattern characterized by a predetermined pattern of 93 liquid crystal droplets, each having a droplet amount of about 4 mg, may be formed on each first LCD panel region 101a arranged within a peripheral area of the first region 100a. Still further, a dispensing pattern characterized by a predetermined pattern of 8 liquid crystal droplets, each having a droplet amount of about 4 mg, may be formed on each second LCD panel region 101b arranged within the second region.

Each of the first and second LCD panel regions 101a and 101b may, for example, include patterned spacers. According to principles of the present invention, the patterned spacer may be formed by depositing a photoresist over a substrate according to a spin coating process, followed by various photolithographic patterning process. Centrifugal forces inherently generated by the spin coating process, therefore, cause the thickness of the photoresist formed at the peripheral area of the substrate 100 to be slightly greater than the thickness of the photoresist formed at the central area of the substrate 100. Because the patterned spacers are formed from the deposited photoresist, the thickness of the patterned spacers within the first and second LCD panel regions 101a and 101b arranged at the central area of the substrate (e.g., at a central area of the first and second regions 100a and 100b) is slightly less than the thickness of the patterned spacers within the first and second LCD panel regions 101a and 101b arranged at the peripheral area of the substrate (e.g., at a peripheral area of the first and second regions 100a and 100b). Because the patterned spacers define the width of the cell gap, the width (and, therefore, volume) of the cell gap of respective ones of the first and second LCD panel regions 101a and 101b arranged at the central area of the substrate 100 is slightly less than the width (and, therefore, volume) of the cell gap of the first and second LCD panel regions 101a and 101b arranged at the peripheral area of the substrate 100. It should be noted that the spacer height characteristics described above are merely exemplary and that the principles of the present invention may be equally applied to substantially any distribution of spacer heights across the substrate 100.

Due to the relatively large size of the first LCD panel regions 101a within the first region 100a, the cell gap volume of the first LCD panel regions 101a arranged within the central area of the first region 100a is less than the cell gap volume of the first LCD panel regions 101a arranged within the peripheral area of the first region 100b. Thus, to ensure that each cell gap of each first LCD panel region 101a contains an sufficient amount of liquid crystal material to ensure fabrication of a non-defective LCD device, the dispensing patterns of first LCD panel regions 101a arranged within the peripheral area of the first region 100a may contain at least one more liquid crystal droplet than dispensing patterns of first LCD panel regions 101a arranged within the central area of the first region 100a. Accordingly, the amount of liquid crystal material dispensed within individual ones of first LCD panel regions 101a formed at the central and peripheral areas of the substrate 100 may be about 368 mg (92×4 mg) and about 372 mg (93×4 mg), respectively. As shown, the difference between the amount of liquid crystal material dispensed within the first LCD panel regions 101a formed in the peripheral area as compared with the amount of liquid crystal material dispensed within the first LCD panel regions 101a formed in the central area is only about 4 mg. Moreover, the added liquid crystal material is substantially negligible with respect to the total amount of liquid crystal material dispensed within each of the first LCD panel regions 101a in the peripheral area of the first region 100a (e.g., about 4/372=1/93 of the total amount dispensed). In one aspect of the present invention, the aforementioned dispensing pattern compensating unit 244 may compensate (i.e., adjust) dispensing patterns of, for example, any of the first LCD panel regions 101a to include more or less numbers of liquid crystal droplets from some predetermined dispensing pattern.

If, as mentioned above, the dispensing patterns of each of the second LCD panel regions 101b comprise the same number of liquid crystal droplets, the amount of liquid crystal material dispensed within each of the second LCD panel regions 101b is only about 32 mg (8×4 mg). However, due to the relatively small size of the second LCD panel regions 101b within the second region, the cell gap volume of the second LCD panel regions 101b arranged within the peripheral area of the second region 100b is only slightly greater than the cell gap volume of the second LCD panel regions 101b arranged within the central area of the second region 100b (i.e., the difference between cell volumes of the various first LCD panel regions 101a is greater than the difference between cell volumes of the various second LCD panel regions 101b). Thus, to ensure that each cell gap of each second LCD panel region 101b contains a sufficient amount of liquid crystal material, dispensing patterns of the second LCD panel regions 101b arranged within the peripheral area of the second region 100b cannot contain more liquid crystal droplets than dispensing patterns of second LCD panel regions 101b arranged within the central area of the second region 100b. For example, if dispensing patterns of the second LCD panel regions 101b at the peripheral area of the second region 100b included just one more liquid crystal droplet than dispensing patterns of the second LCD panel regions 101b at the central area of the second region 100b, second LCD panel regions 101b at the peripheral area would contain about 4 mg of more liquid crystal material than second LCD panel regions 101b at the central area. The added liquid crystal material is considerable with respect to the total amount of liquid crystal material dispensed within each of the second LCD panel regions 101b at the peripheral area of the second region 100b (e.g., about 1/8 of the total amount dispensed).

Accordingly, and as discussed in greater detail with respect to FIG. 17B, the principles of the present invention ensure that each cell gap of each second LCD panel region 101b contains a sufficient amount of liquid crystal material by adjusting the dispensing pattern (i.e., via changing the number of liquid crystal droplets dispensed), but by adjusting the amount of liquid crystal material within the dispensed liquid crystal droplets. In one aspect of the present invention, the aforementioned single dispensing amount compensating unit 246 may compensate (i.e., adjust) the amount of liquid crystal material contained within the liquid crystal droplets dispensed on, for example, any of the second LCD panel regions 101b.

Referring to FIG. 17B, and as similarly discussed above with respect to FIG. 17A, the amount of liquid crystal material contained within individual droplets dispensed onto the first LCD panel regions 101a (i.e., droplet amount) may be fixed while the dispensing patterns of the first LCD panel regions 101a are adjusted in correspondence with the difference in spacer height between the first LCD panel regions 101a arranged at the peripheral area of the first region 100a and the first LCD panel regions 101a arranged at the central area of the first region 100a. However, and as exemplarily illustrated in FIG. 17B, the dispensing pattern of the second LCD panel regions 101b may be fixed while the droplet amount for each droplet dispensed onto the second LCD panel regions 101b is adjusted in correspondence with the difference in spacer height between the second LCD panel regions 101b arranged at the peripheral area of the second region 100b and the second LCD panel regions 101b arranged at the central area of the second region 100b. In one aspect of the present invention, the droplet amount for each second LCD panel region 101b may increase from the central area of the second region 100b to the peripheral area of the second region 100b. In another aspect of the present invention, a first droplet amount may, for example, be about 4 mg in second LCD panel regions 101*b* arranged at the central area of the second region 100*b*; a second droplet amount may, for example, be about 4.1 mg in second LCD panel regions 101*b* arranged at the central area of the second region 100*b*; and a third droplet amount in second LCD panel regions 101*b* arranged in an intermediate area, between the central and peripheral areas of the second region 100*b*, may be between the first and second droplet amounts (e.g., about 4.05 mg).

Thus, as discussed above, a sufficient amount of liquid crystal material to prevent the fabrication of a defective LCD device may be dispensed onto LCD panels of multiple sizes and multiple spacer heights by, for example, adjusting a dispensing pattern of liquid crystal droplets and/or by adjusting amounts of liquid crystal material contained within individually dispensed liquid crystal drops. In one aspect of the present invention, the dispensing pattern of an LCD panel may be adjusted from a predetermined dispensing pattern while fixing an amount of liquid crystal material contained within individually dispensed liquid crystal drops (i.e., a droplet amount) for the LCD panel. In another aspect of the present invention, the droplet amount of an LCD panel may be adjusted from a predetermined droplet amount while fixing a dispensing pattern for the LCD panel. In still another aspect of the present invention, both the dispensing pattern and droplet amount of an LCD panel may be adjusted from a predetermined dispensing pattern and droplet amount for the LCD panel. In yet another aspect of the present invention, an LCD panel may, for example, include liquid crystal droplets of multiple droplet amounts. It will be appreciated that the principles of the present invention may be readily extended to the fabrication of LCD panels of multiple-sizes using the same glass substrate, to the fabrication of LCD panels of a single size using the same glass substrate, or to the fabrication of LCD panels with cell gaps of multiple widths formed, for example by spacers with multiple heights.

Figure 18:
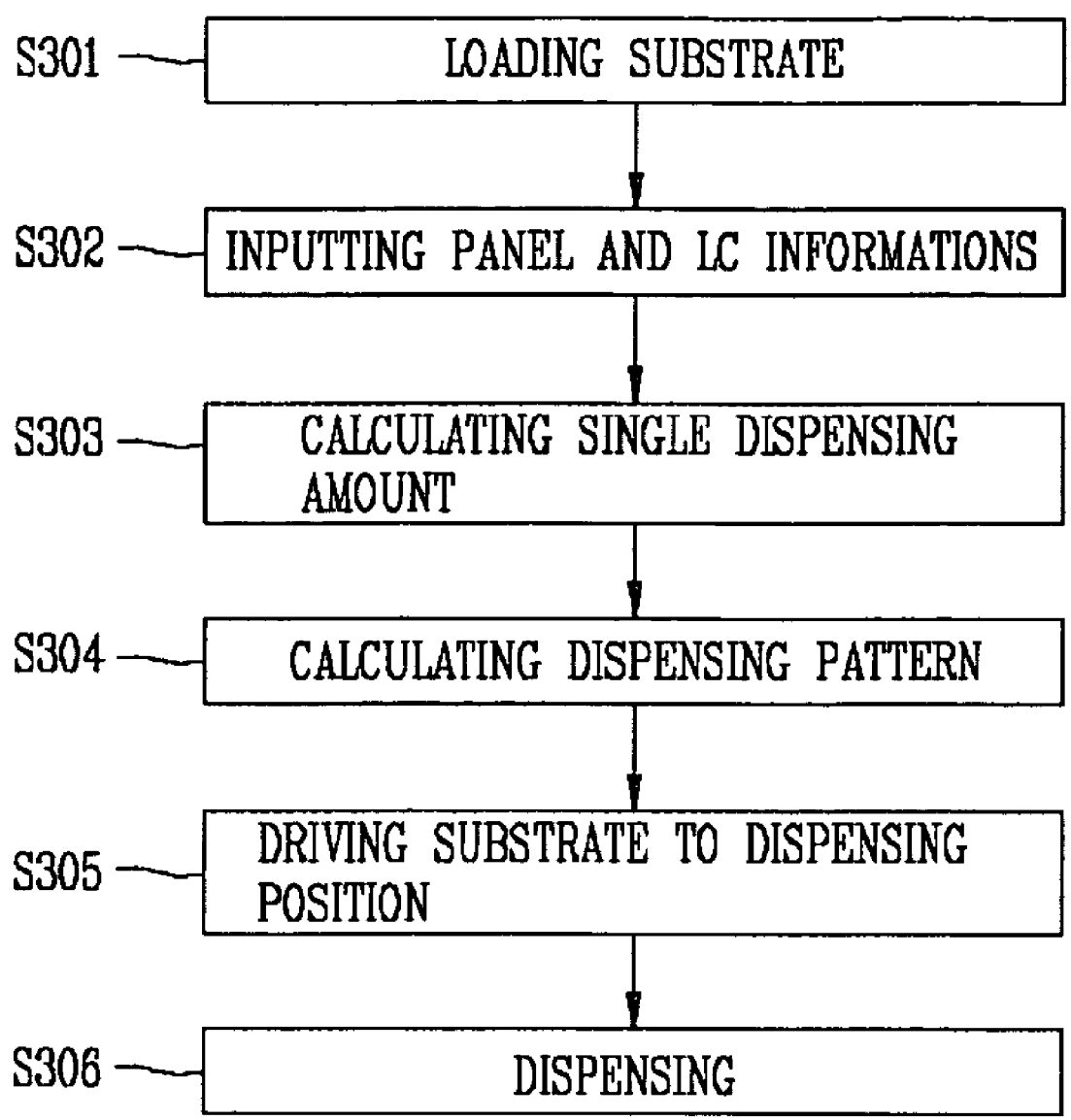
FIG. 18 illustrates a flow chart of a method for calculating a total amount of liquid crystal material to be dispensed according to principles of the present invention.

FIG. 18 illustrates a flow chart of a method for calculating a total amount of liquid crystal material to be dispensed according to principles of the present invention.

Referring to FIG. 18, at step S301, a glass substrate 100 having LCD panels 101 with predetermined size(s) may be arranged operably proximate to (e.g., loaded onto) the liquid crystal dispensing apparatus. Either before, concurrent with, or after step S301, information related to the loaded LCD panels, information relating to, for example, the LCD panel and the liquid crystal material may be input to, for example, the inputting unit 210 of the liquid crystal dispensing apparatus (see step S302). Next, at step S303, the single dispensing amount calculating unit 231 of the dispensing amount calculating unit 230 may calculate an amount of liquid crystal material to be dispensed within a liquid crystal droplet based on the input information. Next, at step S304, the dispensing pattern calculating unit 232 may calculate a dispensing pattern of liquid crystal droplets to be dispensed onto the LCD panel 101 based on the input information. Next, at step S305, the substrate 100 and/or the liquid crystal dispensing apparatus 120 may be moved by the alignment driving unit 260 to thereby align the initial dispensing position of the liquid crystal panel 101 and the nozzle 150 of the liquid crystal dispenser 120. Subsequently, at step S306, the motor driving unit 250 may be operated to dispense liquid crystal droplets according to the calculated dispensing pattern. In one aspect of the present invention, the substrate 100 and/or the liquid crystal dispensing apparatus 120 may be moved to perform the aforementioned dispensing. In another aspect of the present invention, the aforementioned motor driving unit 250 may control an operation of the liquid crystal discharge pump 140 via the first motor 131. In still another aspect of the present invention, the aforementioned motor driving unit 250 may controllably vary the fixation angle of the liquid crystal discharge pump 140 by controlling the second motor 133, wherein the fixation angle corresponds to the calculated droplet amount. In yet another aspect of the present invention, the first motor 131 and the second motor 133 may be provided as step motors and the droplet amount calculated by the single dispensing amount calculating unit 231 may be converted into a pulse value that is output by the motor driving unit 250 to operate the second motor 133.

Figure 19:
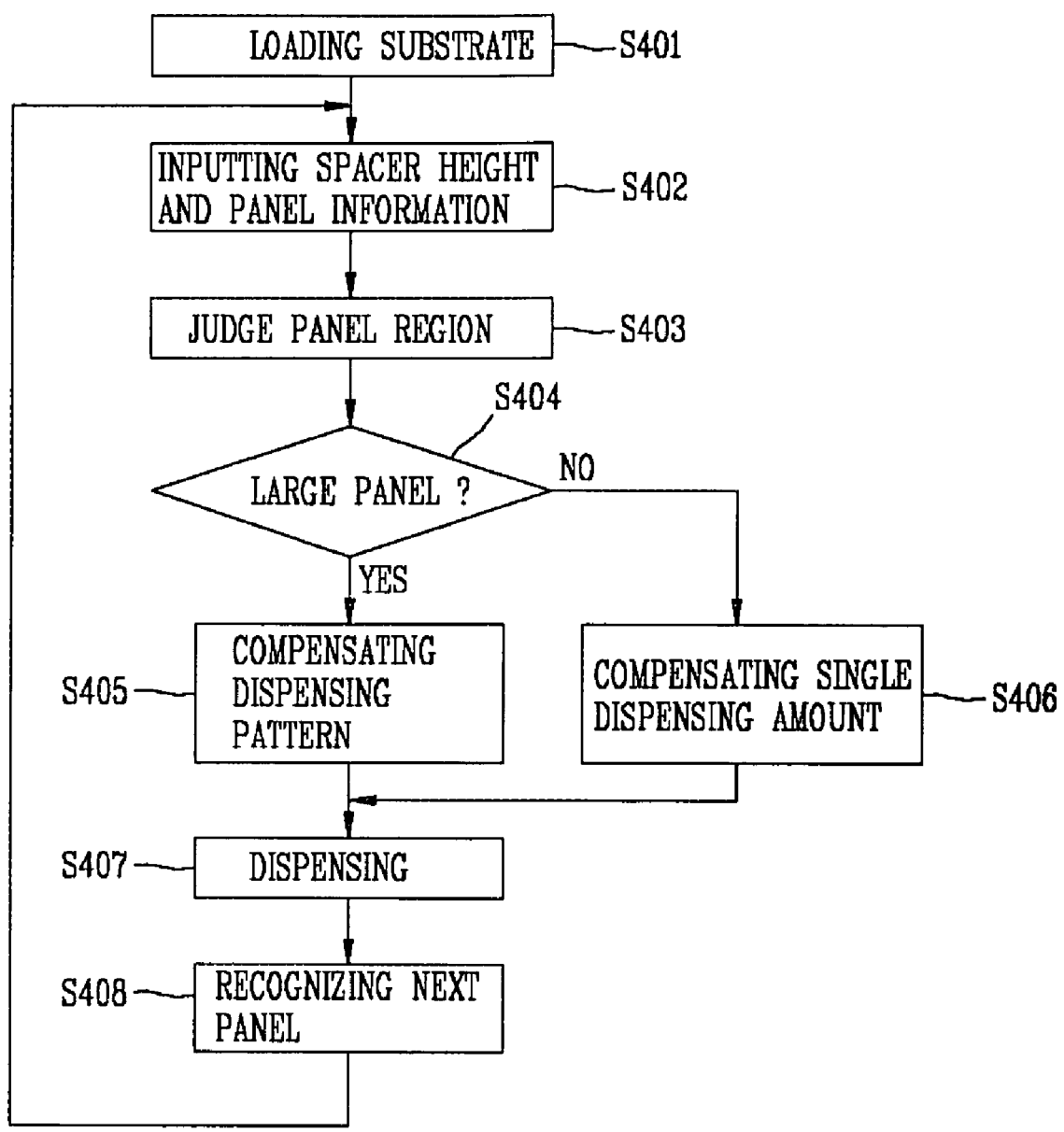
FIG. 19 illustrates a flow chart of a method for compensating a total amount of liquid crystal material to be dispensed according to principles of the present invention.

FIG. 19 illustrates a flow chart of a method for compensating a total amount of liquid crystal material to be dispensed according to principles of the present invention.

According to principles of the present invention, the process described with respect to FIG. 19 may be applicable to the fabrication of multiple LCD panels having a single size or having different sizes.

Referring to FIG. 19, at step S401, a glass substrate 100 having liquid crystal panels 101 with predetermined size(s) is arranged operably proximate to (e.g., loaded onto) the liquid crystal dispensing apparatus. Either before, concurrent with, or after step S401, information relating to, for example, the LCD panel and the liquid crystal material may be input to, for example, the inputting unit 210 and information relating to the spacer height, may be input to, for example, the spacer height inputting unit 220 the liquid crystal dispensing apparatus (see step S402). Using the information input at step S402, the dispensing pattern and amount of liquid crystal material to be dispensed within a liquid crystal droplet in a manner as discussed above with respect to FIG. 18. Subsequently, in step S403, the liquid crystal panel certifying unit 403 of the aforementioned compensation amount calculating unit 240 may certify the size of the actual area of an LCD panel region onto which liquid crystal material is to be dispensed. At step S404, it is determined whether the actual area of the LCD panel region 101 is larger or smaller than a predetermined area of a predetermined LCD panel region.

If, at step S404, the actual area of the LCD panel region 101 is larger than the predetermined area, the aforementioned dispensing pattern compensating unit 244 may, for example, compensate a predetermined dispensing pattern of liquid crystal droplets to be dispensed onto the LCD panel region 101 based on the input information including, for example, the spacer height (see step S405). In one aspect of the present invention, the predetermined dispensing pattern may be compensated, for example, by adjusting the number of liquid crystal droplets dispensed onto the LCD panel region 101. For example, and as shown in FIGS. 15A to 15C, the predetermined dispensing pattern (defined by liquid crystal droplets dispensed at positions included within the first group of liquid crystal droplet positions 107*a*) may be compensated by additionally dispensing liquid crystal droplets at positions included within the second group of liquid crystal droplet positions 107*b*. Alternatively, and in view of the discussion above regarding FIGS. 15A to 15C, the predetermined dispensing pattern (defined by liquid crystal droplets dispensed at positions included within the first and second groups of liquid crystal droplet positions 107*a* and 107*b*) may be compensated by not dispensing liquid crystal droplets at positions included within the second group of liquid crystal droplet positions 107*b*.

If, at step S404, the actual area of the LCD panel region 101 is smaller than the predetermined area, the aforementioned single dispensing amount compensating unit 246 may, for example, compensate the amount of liquid crystal material dispensing contained within individually dispensed liquid crystal droplets corresponding to input information including, for example, the spacer height (see step S406).

Next, after either of steps S405 or S406, the substrate 100 and/or the liquid crystal dispensing apparatus 120 may be moved by the alignment driving unit 260 to thereby align the initial dispensing position of the LCD panel region 101 and the nozzle 150 of the liquid crystal dispenser 120. Subsequently, at step S407, the motor driving unit 250 may be operated to dispense liquid crystal droplets in accordance with the output of the dispensing amount compensating unit 240. When the dispensing operation is complete, the process may be repeated for another LCD panel region (see step S409).

As discussed above, the method illustrated at least in FIG. 19 enables the total amount of liquid crystal material dispensed onto a plurality of LCD panels of various sizes all formed on the same substrate by to be compensated (i.e., adjusted) with respect to a predetermined total amount by, for example, compensating the amount of liquid crystal material contained within individually dispensed liquid crystal droplets and by compensating a dispensing pattern of liquid crystal droplets. In one aspect of the present invention, the total amount of liquid crystal material dispensed onto each LCD panel region may be compensated in accordance with, for example, the volume of the cell gap within each respective LCD panel (as determined by variations in the cell gap width, variations in spacer height, variations in LCD panel area, etc.). It will be readily appreciated that the principles of the present invention may be readily extended to techniques of dispensing liquid crystal material on LCD panels formed from the same substrate, wherein the LCD panels have not only two different sizes, but may have only one size (e.g., relatively large or relatively small) or more than two different sizes. Further, it will be appreciated that the principles of the present invention may be readily extended to techniques of dispensing liquid crystal material on LCD panels formed from the same substrate, wherein the LCD panels are of the same or different display modes (e.g., TN, IPS, VA, etc.).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An apparatus for dispensing liquid crystal material onto a plurality of liquid crystal display (LCD) panel regions formed on a substrate, the apparatus comprising:
a container for containing the liquid crystal material;
a discharge pump for drawing in the liquid crystal material from the container and discharging the drawn liquid crystal material;
a nozzle for dispensing the discharged liquid crystal material onto each LCD panel region as a plurality of liquid crystal droplets; and
a control unit for calculating a total amount of liquid crystal material to be dispensed onto each LCD panel region as a predetermined number of liquid crystal droplets arranged in a predetermined dispensing pattern and each liquid crystal droplet having a predetermined amount of liquid crystal material contained therein and for compensating the total amount of liquid crystal material by at least one of:
compensating the predetermined number of liquid crystal droplets arranged within the predetermined dispensing pattern, and
compensating the predetermined amount of liquid crystal material within at least one liquid crystal droplet.

2. The apparatus of claim 1, wherein the discharge pump includes:
a cylinder having a suction opening and a discharge opening; and
a piston for drawing the liquid crystal material in through the suction opening and for discharging the liquid crystal material out through the discharge opening.

3. The apparatus of claim 2, wherein:
the piston arranged within the cylinder; and
a groove is arranged at a center region of a lower portion of the piston.

4. The apparatus of claim 3, wherein the piston is rotatable and axially translatable within the cylinder.

5. The apparatus of claim 1, further comprising a liquid crystal capacity amount controlling member coupled to the discharge pump that varies a fixation angle of the discharge pump to control the amount of liquid crystal material discharged by the discharge pump.

6. The apparatus of claim 1, wherein the control unit:
compensates the predetermined number of liquid crystal droplets arranged within the predetermined dispensing pattern if an area of the LCD panel is larger than a predetermined area, and
compensates the predetermined amount of liquid crystal material within at least one liquid crystal droplet if the area of the LCD panel region is smaller than the predetermined area.

7. The apparatus of claim 1, wherein the control unit includes:
a spacer height inputting unit for receiving a spacer height of each LCD panel region;
a dispensing amount calculating unit for calculating the total amount of liquid crystal material to be dispensed onto each LCD panel region as the predetermined number of liquid crystal droplets arranged in the predetermined dispensing pattern;
a compensation amount calculating unit coupled to the spacer height inputting unit and the dispensing amount calculating unit for compensating the calculated total amount of liquid crystal to be dispensed onto each LCD panel region; and
a motor driving unit for driving a motor to operate the discharge pump.

8. The apparatus of claim 7, further including an inputting unit coupled to the dispensing amount calculating unit and compensation amount calculating unit for receiving information related to the LCD panel region and the liquid crystal material dispensed.

9. The apparatus of claim 1, further including an alignment driving unit for driving at least one of the LCD panel region and the liquid crystal dispensing apparatus, thereby aligning the nozzle with locations on the at least one LCD panel region onto which the liquid crystal droplets are to be dispensed.

10. The apparatus of claim 8, further including an outputting unit coupled to the inputting unit, the spacer height inputting unit, and the dispensing amount calculating unit for communicating information related to a dispensing state of the liquid crystal dispensing apparatus and at least one of the LCD panel region and the liquid crystal material dispensed.

11. The apparatus of claim 8, wherein the dispensing amount calculating unit includes a single dispensing amount calculating unit coupled to the inputting unit for calculating the predetermined amount of liquid crystal material to be dispensed within each liquid crystal droplet.

12. The apparatus of claim 8, wherein the dispensing amount calculating unit includes a dispensing pattern calculating unit coupled to the inputting unit for calculating the predetermined dispensing pattern.

13. The apparatus of claim 8, wherein the dispensing amount calculating unit includes:
a single dispensing amount calculating unit coupled to the inputting unit for calculating the predetermined amount of liquid crystal material to be dispensed within each liquid crystal droplet; and
a dispensing pattern calculating unit coupled to the single dispensing amount calculating unit for calculating the predetermined dispensing pattern.

14. The apparatus of claim 8, wherein the compensation amount calculating unit includes:
an LCD panel certifying unit coupled to the inputting unit for determining the size of an LCD panel region onto which droplets of liquid crystal material are to be dispensed;
a dispensing pattern compensating unit coupled to the spacer height inputting unit, the dispensing amount calculating unit, and the LCD panel certifying unit for compensating the predetermined dispensing pattern when a determined area of an LCD panel region is greater than a predetermined area; and
a single dispensing amount compensating unit coupled to the spacer height inputting unit and the dispensing amount calculating unit for compensating the calculated amount of liquid crystal material to be dispensed within at least one liquid crystal droplet when the determined area is less than the predetermined area.

15. The apparatus of claim 1, wherein the control unit includes:
an inputting unit for receiving information related to each LCD panel region and the liquid crystal dispensed;
a dispensing amount calculating unit for calculating the total amount of liquid crystal material to be dispensed onto each LCD panel region;
a compensation amount calculating unit coupled to the inputting unit and the dispensing amount calculating unit for compensating the calculated total amount of liquid crystal to be dispensed onto each LCD panel region;
a motor driving unit for driving a motor to operate the discharge pump.

16. An apparatus for dispensing liquid crystal material on a plurality of liquid crystal display (LCD) panel regions formed on a substrate, the apparatus comprising:
a container for containing liquid crystal material;
a discharge pump for drawing in the liquid crystal material from the container and discharging the drawn liquid crystal material;
a nozzle for dispensing the discharged liquid crystal material onto each LCD panel region as a liquid crystal droplet; and
a control unit for calculating a total amount of liquid crystal material to be dispensed onto each LCD panel region as a predetermined number of liquid crystal droplets arranged in a predetermined dispensing pattern and for compensating the calculated total amount of liquid crystal to be dispensed by compensating the predetermined dispensing pattern.

17. The apparatus of claim 16, wherein the control unit includes:
a spacer height inputting unit for receiving a spacer height of each LCD panel region;
a dispensing amount calculating unit for calculating the total amount of liquid crystal material to be dispensed onto each LCD panel region as the predetermined number of liquid crystal droplets arranged in the predetermined dispensing pattern;
a dispensing pattern compensating unit coupled to the spacer height inputting unit and the dispensing amount calculating unit for compensating the predetermined dispensing pattern; and
a motor driving unit for driving a motor to operate the discharge pump.

18. The apparatus of claim 16, wherein the dispensing pattern compensating unit compensates the predetermined dispensing pattern by adjusting the number of liquid crystal droplets included within the predetermined dispensing pattern from the predetermined number of liquid crystal droplets.

19. The apparatus of claim 16, wherein the dispensing pattern compensating unit compensates the predetermined dispensing pattern by increasing the number of liquid crystal droplets included within the predetermined dispensing pattern with respect to the predetermined number of liquid crystal droplets.

20. An apparatus for dispensing liquid crystal material on a plurality of liquid crystal display (LCD) panel regions formed on a substrate, the apparatus comprising:
a container for containing liquid crystal material;
a discharge pump for drawing in the liquid crystal material from the container and discharging the drawn liquid crystal material;
a nozzle for dispensing the discharged liquid crystal material onto each LCD panel region as a liquid crystal droplet; and
a control unit for calculating a total amount of liquid crystal material to be dispensed onto each LCD panel region and for compensating the calculated total amount of liquid crystal material to be dispensed by compensating the predetermined amount of liquid crystal material within at least one liquid crystal droplet.

21. The apparatus of claim 20, wherein the control unit includes:
a spacer height inputting unit for receiving a spacer height of each LCD panel region;
a dispensing amount calculating unit for calculating the total amount of liquid crystal material to be dispensed onto each LCD panel region, each liquid crystal droplet having the predetermined amount of liquid crystal material;
a single dispensing amount compensating unit coupled to the spacer height inputting unit and the dispensing amount calculating unit for compensating the calculated amount of liquid crystal material to be dispensed within at least one liquid crystal droplet; and
a motor driving unit for driving a motor to operate the discharge pump.

22. The apparatus of claim 21, wherein the single dispensing amount compensating unit compensates by adjusting the calculated amount of liquid crystal material to be dispensed within at least one liquid crystal droplet from the predetermined amount of liquid crystal material within the at least one liquid crystal droplet.

23. The apparatus of claim 21, wherein the single dispensing amount compensating unit compensates by increasing the amount of liquid crystal material to be dispensed within at least one liquid crystal droplet with respect to the predetermined amount of liquid crystal material within the at least one liquid crystal droplet.

24. The apparatus of claim 20, wherein the control unit includes:
    a spacer height inputting unit for receiving a spacer height of each LCD panel region;
    a dispensing amount calculating unit for calculating the total amount of liquid crystal material to be dispensed onto each LCD panel region as a predetermined number of liquid crystal droplets arranged in a predetermined dispensing pattern;
    a dispensing pattern compensating unit coupled to the spacer height inputting unit and the dispensing amount calculating unit for compensating the predetermined dispensing pattern; and
    a motor driving unit for driving a motor to operate the discharge pump.

25. A method of dispensing liquid crystal material on a plurality of liquid crystal display (LCD) panel regions formed on a substrate, the method comprising:
    calculating a total amount of liquid crystal material to be dispensed onto each LCD panel region as a predetermined number of liquid crystal droplets arranged in a predetermined dispensing pattern, wherein each liquid crystal droplet contains a predetermined amount of liquid crystal material;
    compensating the calculated total amount of liquid crystal material to be dispensed onto at least one LCD panel region;
    aligning a liquid crystal dispensing apparatus with a dispensing positions of each LCD panel region;
    dispensing the calculated total amount of liquid crystal material onto at least one LCD panel region; and
    dispensing the compensated amount of liquid crystal material onto at least one LCD panel region.

26. The method of claim 25, wherein calculating the total amount of liquid crystal material to be dispensed includes:
    calculating an amount of liquid crystal material to be dispensed within each liquid crystal droplet; and
    calculating a dispensing pattern in which the plurality of liquid crystal droplets are to be dispensed.

27. The method of claim 26, further including calculating the amount of liquid crystal material to be dispensed within each liquid crystal droplet based on information related to each LCD panel region on which the liquid crystal droplets are to be dispensed and the liquid crystal material dispensed.

28. The method of claim 27, further including calculating the dispensing pattern within which the plurality of liquid crystal droplets are to be dispensed based on information related to the LCD panel region on which the liquid crystal droplets are to be dispensed and the liquid crystal material dispensed.

29. The method of claim 25, further including determining an area of each LCD panel region, wherein compensating the calculated total amount of liquid crystal material to be dispensed onto the at least one LCD panel region includes:
    compensating the predetermined number of liquid crystal droplets arranged within the predetermined dispensing pattern based on a spacer height of the at least one LCD panel region when the area of the at least one LCD panel region is larger than the predetermined area; and
    compensating the predetermined amount of liquid crystal material contained within at least one liquid crystal droplet based on the spacer height of the at least one LCD panel region when the n area of the at least one LCD panel region is less than the predetermined area.

30. The method of claim 29, wherein compensating the number of liquid crystal droplets arranged within the predetermined dispensing pattern includes adjusting the number of liquid crystal droplets included within the predetermined dispensing pattern from the predetermined number of liquid crystal droplets.

31. The method of claim 30, wherein compensating the number of liquid crystal droplets arranged within the predetermined dispensing pattern includes increasing the number of liquid crystal droplets included within the predetermined dispensing pattern with respect to the predetermined number of liquid crystal droplets.

32. The method of claim 29, wherein compensating the predetermined amount of liquid crystal material contained within at least one liquid crystal droplet includes adjusting the calculated amount of liquid crystal material to be dispensed within at least one liquid crystal droplet from the predetermined amount of liquid crystal material within the at least one liquid crystal droplet.

33. The method of claim 32, wherein compensating the predetermined amount of liquid crystal material contained within at least one liquid crystal droplet includes increasing the amount of liquid crystal material to be dispensed within at least one liquid crystal droplet with respect to the predetermined amount of liquid crystal material within the at least one liquid crystal droplet.

34. A method of dispensing liquid crystal material on a plurality of liquid crystal display (LCD) panel regions formed on a substrate, the method comprising:
    calculating a predetermined amount of liquid crystal material to be dispensed as a single droplet of liquid crystal material;
    calculating a predetermined dispensing pattern in which a plurality of liquid crystal droplets are to be dispensed onto each LCD panel region;
    compensating the predetermined dispensing pattern of at least one LCD panel region based on a spacer height of the at least one LCD panel region; and
    dispensing a plurality of liquid crystal droplets containing the predetermined amount of liquid crystal material onto the at least one LCD panel region in the compensated dispensing pattern.

35. The method of claim 34, wherein compensating the number of liquid crystal droplets arranged within the predetermined dispensing pattern includes adjusting the number of liquid crystal droplets included within the predetermined dispensing pattern from the predetermined number of liquid crystal droplets.

36. The method of claim 35, wherein compensating the number of liquid crystal droplets arranged within the predetermined dispensing pattern includes increasing the number of liquid crystal droplets included within the predetermined dispensing pattern with respect to the predetermined number of liquid crystal droplets.

37. The method of claim 34, wherein compensating the predetermined dispensing pattern of liquid crystal includes increasing the number of liquid crystal droplets arranged within predetermined dispensing patterns dispensed on LCD panel regions at peripheral areas of the substrate over the number of liquid crystal droplets arranged within predetermined dispensing patterns dispensed on LCD panel regions at a central area of the substrate.

38. The method of claim 34, further including compensating the predetermined amount of liquid crystal material to be dispensed as a single droplet of liquid crystal material on at least one LCD panel region based on a spacer height of at least one LCD panel region.

39. A method of dispensing liquid crystal material on a plurality of liquid crystal display (LCD) panel regions formed on a substrate, the method comprising:
   calculating a predetermined amount of liquid crystal material to be dispensed as a single droplet of liquid crystal material;
   calculating a predetermined dispensing pattern in which a plurality of liquid crystal droplets are to be dispensed onto each LCD panel region;
   compensating the predetermined amount of liquid crystal material to be dispensed as a single droplet of liquid crystal material on at least one LCD panel region; and
   dispensing at least one liquid crystal droplet containing the compensated amount of liquid crystal material onto the at least one LCD panel region in the predetermined dispensing pattern.

40. The method of claim 39, wherein compensating the predetermined amount of liquid crystal material contained within at least one liquid crystal droplet includes adjusting the calculated amount of liquid crystal material to be dispensed within at least one liquid crystal droplet from the predetermined amount of liquid crystal material within the at least one liquid crystal droplet.

41. The method of claim 40, wherein compensating the predetermined amount of liquid crystal material contained within at least one liquid crystal droplet includes increasing the amount of liquid crystal material to be dispensed within at least one liquid crystal droplet with respect to the predetermined amount of liquid crystal material within the at least one liquid crystal droplet.

42. The method of claim 39, wherein compensating the predetermined amount of liquid crystal material to be dispensed as a single droplet of liquid crystal material includes increasing the amount of liquid crystal material contained within at least one liquid crystal droplet dispensed on LCD panel regions at peripheral areas of the substrate over the amount of liquid crystal material contained within at least one liquid crystal droplet dispensed on LCD panel regions at a central area of the substrate.

43. The method of claim 39, further including compensating the predetermined dispensing pattern of at least one LCD panel region based on a spacer height of at least one LCD panel region.

44. A method of fabricating liquid crystal display (LCD) panels, comprising:
   providing a first substrate having at least a first and a second LCD panel region;
   providing a second substrate having at least a third and a fourth LCD panel region,
   wherein the third LCD panel region corresponds to the first LCD panel region and wherein the fourth LCD panel region corresponds to the second LCD panel region;
   forming patterned spacers over one of the LCD panel regions of one of first and second substrates;
   dispensing a first amount of liquid crystal material onto the first LCD panel region as a plurality of liquid crystal droplets; and
   dispensing a second amount of liquid crystal material onto the second LCD panel region as a plurality of liquid crystal droplets, wherein first amount of liquid crystal material is greater than the second amount of liquid crystal material;
   providing a second substrate having at lest a third and fourth LCD panel region;
   aligning the first and second substrates such that first LCD panel region is substantially aligned with the third LCD panel region and such that the second LCD panel region is substantially aligned with the fourth LCD panel region;
   bonding the aligned first and second substrates to form a cell gap between the first and third LCD region regions and between second and fourth LCD panel regions defined by the patterned spacer; and
   separating at least the bonded first and third LCD region regions and the bonded second and fourth LCD panel regions.

45. The method of claim 44, wherein an area of the first LCD panel region is greater than an area of the second LCD panel region.

46. The method of claim 44, wherein an area of the first LCD panel region is substantially equal to the area of the second LCD panel region.

47. The method of claim 44, wherein the cell gap between the first and third LCD panel regions is wider than the cell gap between the second and fourth LCD panel regions.

48. The method of claim 44, wherein the cell gap between the first and third LCD panel regions is substantially the same width as the cell gap between the second and fourth LCD panel regions.

49. The method of claim 44, wherein:
   dispensing the first amount of liquid crystal material onto the first LCD panel region includes dispensing the liquid crystal material as a dispensing pattern having a first number of liquid crystal droplets; and
   dispensing the second amount of liquid crystal material onto the second LCD panel region includes dispensing the liquid crystal material as a dispensing pattern having a second number of liquid crystal droplets, wherein the first number of liquid crystal droplets is greater than the second number of liquid crystal droplets.

50. The method of claim 44, wherein:
   dispensing the first amount of liquid crystal material onto the first LCD panel region includes dispensing the liquid crystal material as a plurality of liquid crystal droplets each containing a third amount of liquid crystal material; and
   dispensing the first amount of liquid crystal material onto the first LCD panel region includes dispensing the liquid crystal material as a plurality of liquid crystal droplets each containing a fourth amount of liquid crystal material, wherein the third amount of liquid crystal material is greater than the fourth amount of liquid crystal material.

* * * * *